(12) United States Patent
Kalinina et al.

(10) Patent No.: US 11,261,297 B2
(45) Date of Patent: Mar. 1, 2022

(54) POLYMER, FILM INCLUDING THE POLYMER, AND DISPLAY DEVICE INCLUDING THE FILM

(71) Applicant: Samsung Electronics Co., Ltd., Suwon-si (KR)

(72) Inventors: Fedosya Kalinina, Hwaseong-si (KR); Dmitry Androsov, Suwon-si (KR); Hyunseok Choi, Seoul (KR)

(73) Assignees: SAMSUNG ELECTRONICS CO., LTD., Gyeonggi-do (KR); SAMSUNG DISPLAY CO., LTD., Gyeonggi-do (KR)

( * ) Notice: Subject to any disclaimer, the term of this patent is extended or adjusted under 35 U.S.C. 154(b) by 218 days.

(21) Appl. No.: 16/283,207

(22) Filed: Feb. 22, 2019

(65) Prior Publication Data

US 2019/0256659 A1   Aug. 22, 2019

(30) Foreign Application Priority Data

Feb. 22, 2018   (KR) .................. 10-2018-0021278

(51) Int. Cl.
*C08G 73/10* (2006.01)
*C08G 73/06* (2006.01)
(Continued)

(52) U.S. Cl.
CPC ..... *C08G 73/1067* (2013.01); *C08G 73/0672* (2013.01); *C08G 73/1014* (2013.01);
(Continued)

(58) Field of Classification Search
None
See application file for complete search history.

(56) References Cited

U.S. PATENT DOCUMENTS 4,058,505 A    11/1977  D'Alelio
4,749,777 A *   6/1988  Kohtoh .............. C08G 73/1014
                                                  528/351
(Continued)

FOREIGN PATENT DOCUMENTS

CN    103102794 A  *  5/2013
EP      0249331 A1    12/1987
(Continued)

OTHER PUBLICATIONS

Extended European Search Report dated Jul. 29, 2019, issued in European Patent Application No. 19 15 8211.3, 8 pp.
(Continued)

*Primary Examiner* — Rachel Kahn
(74) *Attorney, Agent, or Firm* — Cantor Colburn LLP

(57) ABSTRACT

A polymer is disclosed, represented by Chemical Formula 1 or Chemical Formula 2:

Chemical Formula 1

(Continued)

-continued

Chemical Formula 2

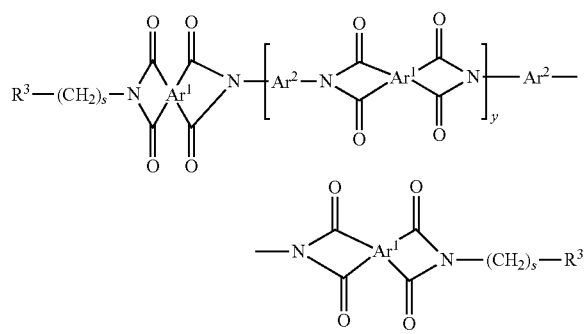

wherein, in Chemical Formula 1 and Chemical Formula 2, $Ar^1$, $Ar^2$, $R^3$, s, x, and y are defined in the detailed description.

17 Claims, 5 Drawing Sheets

(51) Int. Cl.
  *C08G 85/00* (2006.01)
  *C08L 79/08* (2006.01)
  *G02B 5/30* (2006.01)
  *C09D 179/08* (2006.01)
  *C08G 73/16* (2006.01)

(52) U.S. Cl.
  CPC ..... *C08G 73/1017* (2013.01); *C08G 73/1039* (2013.01); *C08G 73/1042* (2013.01); *C08G 73/16* (2013.01); *C08G 85/004* (2013.01); *C08L 79/08* (2013.01); *C09D 179/08* (2013.01); *G02B 5/305* (2013.01); *C08L 2201/10* (2013.01); *C08L 2203/14* (2013.01)

(56) References Cited

U.S. PATENT DOCUMENTS

| | | | | |
|---|---|---|---|---|
| 5,070,181 | A * | 12/1991 | Kawai | C08G 73/1067 528/353 |
| 5,518,652 | A * | 5/1996 | Parri | C08F 220/30 252/299.01 |
| 5,571,579 | A * | 11/1996 | Kato | C09D 179/08 428/1.25 |
| 7,019,104 | B1 | 3/2006 | Okada et al. | |
| 7,646,457 | B2 | 1/2010 | Fukagawa et al. | |
| 7,815,823 | B2 | 10/2010 | Murakami et al. | |
| 9,366,906 | B2 | 6/2016 | Lincker et al. | |
| 2006/0082708 | A1* | 4/2006 | Nagase | G02B 5/305 349/124 |
| 2012/0021142 | A1 | 1/2012 | Lee et al. | |
| 2014/0213739 | A1 | 7/2014 | Gallucci et al. | |
| 2017/0130004 | A1 | 5/2017 | Choi et al. | |
| 2017/0275425 | A1* | 9/2017 | Sato | C08G 73/1007 |
| 2019/0031831 | A1* | 1/2019 | Androsov | C08G 73/1067 |

FOREIGN PATENT DOCUMENTS

| | | | |
|---|---|---|---|
| EP | 0249881 | A1 | 12/1987 |
| EP | 0371154 | A1 | 6/1990 |
| EP | 0587122 | A1 | 3/1994 |
| EP | 3438156 | A1 | 2/2019 |
| JP | 2004182757 | A | 7/2004 |
| JP | 2006137881 | A | 6/2006 |
| JP | 2009134121 | A | 6/2009 |
| JP | 5182886 | B2 | 1/2013 |
| JP | 5284567 | B2 | 6/2013 |
| JP | 2014534272 | A | 12/2014 |
| JP | 2015200776 | A | 11/2015 |
| KR | 1020070023778 | A | 2/2007 |
| KR | 101042214 | B1 | 6/2011 |
| WO | 2014012448 | A1 | 1/2014 |
| WO | WO-2016147997 | A1 * | 9/2016 ......... C08G 73/1017 |

OTHER PUBLICATIONS

Amy E. Eichstadt, et al., "Structure-Property Relationships for a Series of Amorphous Partially Aliphatic Polyimides", Journal of Polymer Science: Part B: Polymer Physics, vol. 40, 1503-1512 (2002).

Fuming Li, et al., "Molecular weight and film thickness effects on linear optical anisotropy of 6FDA-PFMB polyimides", Polymer vol. 38, No. 13, pp. 3223-3227, 1997.

Fuming Li, et al., "Polyimide films as negative birefringent compensators for normally white twisted nematic liquid crystal displays", Polymer vol. 37, No. 23, 1996, 5 pp.

Hong-jiang Ni, et al., "A reviewon colorless and optically transparent polyimide films: Chemistry, process and engineering applications", Journal of Industrial and Engineering Chemistry 28 (2015) 16-27.

Lang Yi, et al., "Polyimides with Side Groups: Synthesis and Effects of Side Groups on Their Properties", Journal of Polymer Science, Part A: Polymer Chemistry 2017, 55, 533-559.

Masatoshi Hasegawa, et al., "Optically transparent aromatic poly(ester imide)s with low coefficients of thermal expansion (1). Self-orientation behavior during solution casting process and substituent effect", Polymer 74 (2015) 1-55.

S. Andre, et al., "Synthesis, Characterization, and Thermal Properties of Anhydride Terminated and Allyl Terminated Oligoimides", Journal of Polymer Science: Part A: Polymer Chemistry, vol. 38, 2993-3003 (2000).

Xiuzhi Tian, et al., "Synthesis and characterization of soluble and transparent co-polyimides with controlled glass transition temperature", Indian Journal of Chemical Technology, vol. 19, Jul. 202, pp. 271-277.

Yu Zhou, et al., "Synthesis and characterization of transparent polyimides derived from ster-containing dianhydrides with different electron affinities", RCS Adv. 2015, 79207-79215.

* cited by examiner

POLYMER, FILM INCLUDING THE POLYMER, AND DISPLAY DEVICE INCLUDING THE FILM

CROSS-REFERENCE TO RELATED APPLICATION

This application claims priority to Korean Patent Application No. 10-2018-0021278 filed in the Korean Intellectual Property Office on Feb. 22, 2018, and all the benefits accruing therefrom under 35 U.S.C. § 119, the content of which is incorporated herein in its entirety by reference.

BACKGROUND

1. Field

A polymer, a film including the polymer, and a display device including the film are disclosed.

2. Description of the Related Art

Research efforts have been undertaken to produce a colorless transparent material that is suitable for diverse purposes such as for an optical lens, a functional optical film, and a disk substrate. However, as information devices are being further miniaturized and display devices are providing higher resolution, more functions and greater performance are required from the material.

Therefore, researcher efforts are currently underway to develop a colorless transparent material having improved transparency, heat resistance, mechanical strength, and flexibility.

SUMMARY

An embodiment provides a novel polymer having excellent optical properties, high heat resistance, high birefringence, and excellent processability.

Another embodiment provides a film including the polymer.

Yet another embodiment provides a display device including the film.

An embodiment provides a polymer represented by Chemical Formula 1 or Chemical Formula 2:

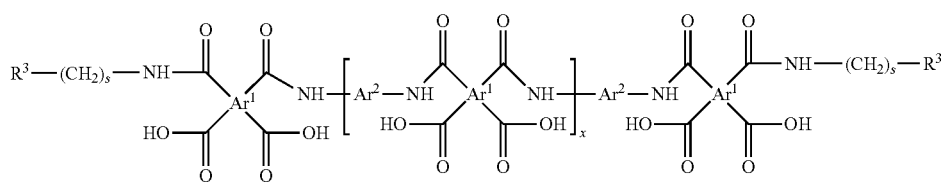

Chemical Formula 1

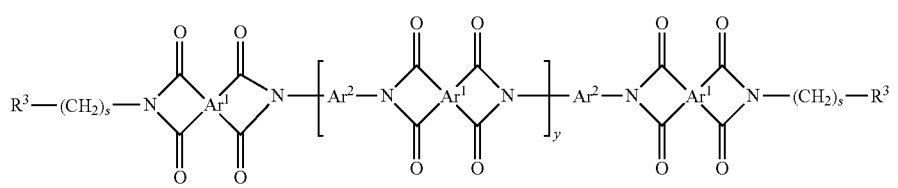

Chemical Formula 2 wherein, in Chemical Formula 1 and Chemical Formula 2,
$Ar^1$ is a substituted or unsubstituted C6 to C30 aromatic organic group, a group represented by Chemical Formula 3, a group represented by Chemical Formula 4, or a combination thereof:

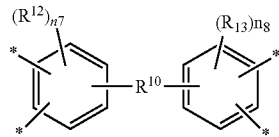

Chemical Formula 3 wherein, in Chemical Formula 3,
$R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), or a combination thereof,
$R^{12}$ and $R^{13}$ are independently a halogen, a hydroxy group, a substituted or unsubstituted C1 to C10 aliphatic organic group, a substituted or unsubstituted C6 to C20 aromatic organic group, a —OR$^{201}$ group (wherein R$^{201}$ is a C1 to C10 aliphatic organic group), or a —SiR$^{210}$R$^{211}$R$^{212}$ (wherein R$^{210}$, R$^{211}$ and R$^{212}$ are independently hydrogen or a C1 to C10 aliphatic organic group) group, and
n7 and n8 are independently one of integers of 0 to 3;

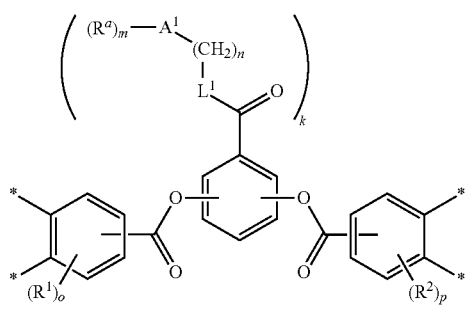

Chemical Formula 4 wherein, in Chemical Formula 4,
$R^1$ and $R^2$ are independently a substituted or unsubstituted C1 to C30 alkyl group, a substituted or unsubstituted C3 to C30 cycloalkyl group, a substituted or unsubstituted C1 to C30 alkoxy group, a substituted or unsubstituted C6 to C30 aryl group, a substituted or unsubstituted C2 to C30 acyl group, a hydroxy group, a halogen, a nitro group, —NR'R" (wherein R' and R" are independently hydrogen, a C1 to C30 alkyl group, or a C6 to C30 aryl group), —SiR'R"R'"

(wherein R', R", and R'" are independently hydrogen, a C1 to C30 alkyl group, or a C6 to C30 aryl group), or a combination thereof, $L^1$ is O or $NR^b$ (wherein $R^b$ is hydrogen or a C1 to C20 alkyl group), $A^1$ is a C6 to C30 aromatic organic group, and $R^a$ is hydrogen, a substituted or unsubstituted C1 to C30 alkyl group, a substituted or unsubstituted C1 to C30 alkoxy group, a substituted or unsubstituted C3 to C30 cycloalkyl group, a substituted or unsubstituted C6 to C30 aryl group, a substituted or unsubstituted C7 to C30 arylalkyl group, a hydroxy group, a halogen, a nitro group, —NR'R" (wherein R' and R" are independently hydrogen, a C1 to C30 alkyl group, a C6 to C30 aryl group, or a C7 to C30 arylalkyl group), —CO—NR'R" (wherein R' and R" are independently hydrogen, a C1 to C30 alkyl group, a C6 to C30 aryl group, or a C7 to C30 arylalkyl group), —SiR'R"R'" (wherein R', R", and R'" are independently hydrogen, a C1 to C30 alkyl group, a C6 to C30 aryl group, or a C7 to C30 arylalkyl group), or a group represented by Chemical Formula 5:

   Chemical Formula 5 wherein, in Chemical Formula 5, $L^2$ and $L^3$ are independently O, CO, COO, C≡C, or $CONR^b$ (wherein $R^b$ is hydrogen or a C1 to C30 alkyl group), $A^2$ and $A^3$ are independently a substituted or unsubstituted C6 to C30 aromatic ring, a substituted or unsubstituted fluorene ring, or a substituted or unsubstituted C7 to C30 arylalkylene or arylalkyl group, q and r are independently an integer ranging from 0 to 3, k is an integer ranging from 0 to 2, m is an integer ranging from 0 to 3, n is an integer ranging from 0 to 20, and o and p are independently an integer ranging from 0 to 3;

$Ar^2$ is a substituted or unsubstituted C6 to C30 aromatic organic group, wherein the substituted or unsubstituted C6 to C30 aromatic organic group is present as a substituted or unsubstituted single aromatic ring; a fused ring comprising two or more substituted or unsubstituted aromatic rings; or a ring system comprising two or more of the substituted or unsubstituted single aromatic ring and/or the fused ring that are linked by a single bond, or a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof;

$R^3$ is hydrogen, a halogen, a vinyl group, an ethynyl group, an isopropyl group, a sec-butyl group, a tert-butyl group, a C3 to C20 cycloalkyl group, a C6 to C20 aryl group, or a combination thereof;

s is an integer ranging from 1 to 30, and x and y are independently an integer greater than or equal to 1.

In Chemical Formula 3, $R^{10}$ may be a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, (CH$_2$)$_p$—C(C$_n$F$_{2n+1}$)$_2$—(CH$_2$)$_q$— (wherein 1≤n≤10, 1≤p≤3, and 1≤q≤3), or a combination thereof.

In Chemical Formula 4, $L^1$ may be O, $A^1$ may be a substituted or unsubstituted C6 to C20 aromatic organic group, $R^a$ may be hydrogen, a substituted or unsubstituted C1 to C30 alkyl group, a substituted or unsubstituted C6 to C30 aryl group, a substituted or unsubstituted C7 to C30 arylalkyl group, a halogen, —NR'R" (wherein R' and R" are independently hydrogen, a C1 to C30 alkyl group, a C6 to C30 aryl group, or a C7 to C30 arylalkyl group), —CO—NR'R" (wherein R' and R" are independently hydrogen, a C1 to C30 alkyl group, a C6 to C30 aryl group, or a C7 to C30 arylalkyl group), or a group represented by Chemical Formula 5, k may be 0 or 1, m may be an integer ranging from 0 to 2, and n may be an integer ranging from 1 to 3.

In Chemical Formula 4, $L^1$ may be O, $A^1$ may be a substituted or unsubstituted C6 to C20 aromatic organic group, $R^a$ may be hydrogen, a substituted or unsubstituted C1 to C20 alkyl group, a substituted or unsubstituted C6 to C20 aryl group, a substituted or unsubstituted C7 to C20 arylalkyl group, a halogen, —CO—NR'R" (wherein R' and R" are independently hydrogen, a C1 to C20 alkyl group, a C6 to C20 aryl group, or a C7 to C20 arylalkyl group), or a combination thereof, k may be 1, m may be an integer ranging from 0 to 2, and n may be 1.

In Chemical Formula 5, $L^2$ and $L^3$ may independently be COO, C≡C, or $CONR^b$ (wherein $R^b$ is hydrogen or a C1 to C20 alkyl group), $A^2$ and $A^3$ may independently be a substituted or unsubstituted C6 to C20 aromatic ring, a substituted or unsubstituted fluorene ring, or a substituted or unsubstituted C7 to C20 arylalkylene or arylalkyl group, and q and r may independently be an integer ranging from 0 to 2, provided that 1≤q+r≤2.

In Chemical Formula 1 and Chemical Formula 2, $Ar^2$ may be a ring system that includes two substituted or unsubstituted C6 to C30 aromatic rings linked by a single bond, or a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof.

In Chemical Formula 1 and Chemical Formula 2, $Ar^2$ may be a ring system that includes two substituted or unsubstituted C6 to C30 aromatic rings linked by a single bond.

In Chemical Formula 1 and Chemical Formula 2, $R^3$ may be hydrogen, a halogen, a vinyl group, an ethynyl group, an isopropyl group, a sec-butyl group, a tert-butyl group, a cyclopropyl group, a cyclobutyl group, a cyclopentyl group, a cyclohexyl group, a cycloheptyl group, a cyclooctyl group, a cyclononyl group, a cyclodecyl group, a phenyl group, or a combination thereof.

In Chemical Formula 1 and Chemical Formula 2, $Ar^1$ may include a combination of the group represented by Chemical Formula 3 and the group represented by Chemical Formula 4.

In the combination of the group represented by Chemical Formula 3 and the group represented by Chemical Formula 4, the group represented by Chemical Formula 3 and the group represented by Chemical Formula 4 may be included in a mole ratio of 1:99 to 99:1.

When $Ar^1$ includes a combination of the group represented by Chemical Formula 3 and the group represented by Chemical Formula 4, $R^{10}$ of Chemical Formula 3 may be single bond, —C(CF$_3$)$_2$—, or a combination thereof, and in Chemical Formula 4, $L^1$ may be O, $A^1$ may be a phenyl or phenylene group, $R^a$ may be hydrogen, a C1 to C30 alkyl group, a C6 to C30 aryl group, or a C7 to C30 arylalkyl group, —F, —Cl, —NR'R", —CONR'R" (wherein R' and R" are independently hydrogen, a C1 to C30 alkyl group, a C6 to C30 aryl group, or a C7 to C30 arylalkyl group), or a group represented by Chemical Formula 5, k may be 0 or 1, m may be an integer ranging from 0 to 2, and n may be an integer ranging from 1 to 3.

The polymer may be a reaction product of reactants that include at least one selected from a tetracarboxylic dianhydride having a substituted or unsubstituted C6 to C30 aromatic ring group, a dianhydride represented by Chemical Formula 7 and a dianhydride represented by Chemical Formula 8, a diamine represented by Chemical Formula 9, and a monoamine represented by Chemical Formula 10:

Chemical Formula 7

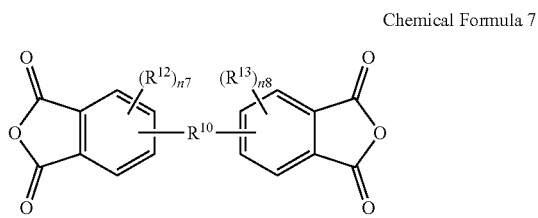

Wherein, in Chemical Formula 7, $R^{10}$, $R^{12}$, $R^{13}$, n7 and n8 are independently the same as defined in Chemical Formula 3;

Chemical Formula 8

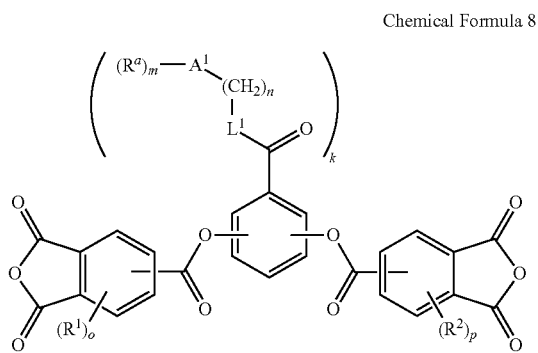

Wherein, in Chemical Formula 8,
$R^1$, $R^2$, $R^a$, $A^1$, k, m, n, o, and p are independently the same as defined in Chemical Formula 4;

$NH_2$—$Ar^2$—$NH_2$    Chemical Formula 9

Wherein, in Chemical Formula 9, $Ar^2$ is the same as defined in Chemical Formula 1 and Chemical Formula 2;

$NH_2$—$(CH_2)_s$—$R^3$    Chemical Formula 10

Wherein, in Chemical Formula 10, $R^3$ and s are the same as defined in Chemical Formula 1 and Chemical Formula 2.

In the reactants, the at least one selected from a tetracarboxylic dianhydride having a substituted or unsubstituted C6 to C30 aromatic ring group, the dianhydride represented by Chemical Formula 7 and the dianhydride represented by Chemical Formula 8, and the diamine represented by Chemical Formula 9 may be present in a mole ratio of 1:0.8 to 0.95.

In the reactants, the at least one selected from a tetracarboxylic dianhydride having a substituted or unsubstituted C6 to C30 aromatic ring group, the dianhydride represented by Chemical Formula 7 and the dianhydride represented by Chemical Formula 8, and the diamine represented by Chemical Formula 10 may be present in a mole ratio of 1:0.1 to 0.4.

Another embodiment provides a film including the polymer according to the embodiment.

The film may have a glass transition temperature of from 160° C. to 200° C.

The film may have a high out-of-plane birefringence ($\Delta n_{th}$) of greater than 0.05.

Another embodiment provides a display device including the compensation film according to the embodiment, and a polarizer.

Still another embodiment provides a display device including the film according to the embodiment.

A novel polymer according to an embodiment may be used to form an article, such as, for example, a film, having excellent optical properties, such as, a high transmittance, a low yellowness index, a low haze, and a high out-of-plane birefringence, as well as high heat resistance and low glass transition temperature. Further, the polymer may be advantageously used to manufacture a compensation film as it has a low glass transition temperature, and thus shows high solubility to solvents and excellent processability.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
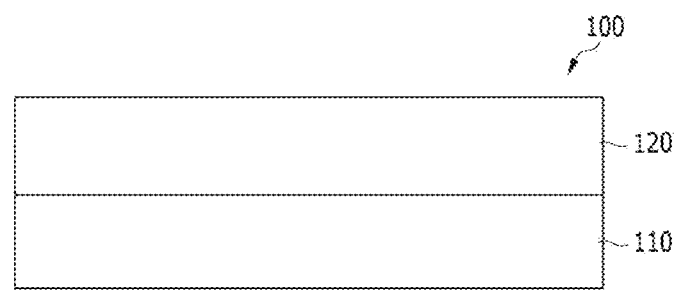
FIG. 1 is a schematic cross-sectional view showing an exemplary embodiment of an optical film.

Hereinafter, exemplary embodiments will be described in detail, and may be readily performed by those who have common knowledge in the related art. However, this disclosure may be embodied in many different forms and should not be construed as limited to the exemplary embodiments set forth herein.

Accordingly, the embodiments are merely described below, by referring to the figures, to explain aspects of the present description. As used herein, the term "and/or" includes any and all combinations of one or more of the associated listed items. The term "or" means "and/or." Expressions such as "at least one of" when preceding a list of elements, modify the entire list of elements and do not modify the individual elements of the list.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or non-linear features. Moreover, sharp angles that are illustrated may be rounded. Thus, the regions illustrated in the figures are schematic in nature and their shapes are not intended to illustrate the precise shape of a region and are not intended to limit the scope of the present claims.

In the chemical structures, a "*" indicates the point of attachment.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, when a definition is not otherwise provided, the term "substituted" refers to replacement of a hydrogen atom of a compound or a functional group by a substituent selected from a halogen atom, a hydroxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C30 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, or a combination thereof.

As used herein, when a definition is not otherwise provided, the term "hetero" refers to inclusion of 1 to 3 hetero atoms selected from N, O, S, Se, and P.

As used herein, when a definition is not otherwise provided, the term "alkyl" indicates a group derived from a completely saturated, branched, or unbranched (or a straight or linear) hydrocarbon group and having a specified number of carbon atoms.

As used herein, the term "cycloalkyl group" refers to a monovalent group having one or more saturated rings in which all ring members are carbon. Non-limiting examples of the cycloalkyl group are cyclopentyl and cyclohexyl.

As used herein, when a definition is not otherwise provided, the term "alkoxy" represents "alkyl-O—", wherein the term "alkyl" has the same meaning as described above.

As used herein, when a definition is not otherwise provided, the term "cycloalkoxy" represents "cycloalkyl-O—", wherein the term "cycloalkyl" has the same meaning as described above.

As used herein, when a definition is not otherwise provided, the term "acyl" represents "alkyl-C(=O)—", wherein the term "alkyl" has the same meaning as described above.

As used herein, when a definition is not otherwise provided, the term "aryl" indicates an aromatic hydrocarbon group containing at least one ring and having the specified number of carbon atoms.

As used herein, when a definition is not otherwise provided, the term "arylalkyl" represents "aryl-alkylene-", wherein the terms "aryl" and "alkyl" have the same meaning as described above.

As used herein, the term "alkylene" indicates a straight or branched saturated aliphatic hydrocarbon group having a valence of at least two, optionally substituted with one or more substituents where indicated, provided that the valence of the alkylene group is not exceeded.

As used herein, when a definition is not otherwise provided, the term "arylene" indicates a divalent or higher valent group formed by the removal of at least two hydrogen atoms from one or more rings of an arene, wherein the hydrogen atoms may be removed from the same or different rings of the arene.

As used herein, when a definition is not otherwise provided, the term "heteroalkylene" indicates a straight or branched saturated aliphatic hydrocarbon group having a valence of at least two, and including one or more heteroatoms selected from nitrogen (N), oxygen (O), sulfur (S), and phosphorus (P), optionally substituted with one or more substituents where indicated, provided that the valence of the alkylene group is not exceeded.

As used herein, when a definition is not otherwise provided, the term "alkylarylene" indicates an arylene group substituted with an alkylene group, wherein the terms "arylene" and "alkylene" have the same meaning as described above.

As used herein, when a definition is not otherwise provided, the term "arylalkylene" indicates an alkylene group substituted with an arylene group, wherein the terms "alkylene" and "arylene" have the same meaning as described above.

As used herein, when a specific definition is not otherwise provided, the term "aliphatic organic group" refers to a C1 to C30 alkyl group, a C2 to C30 alkenyl group, a C2 to C30 alkynyl group, a C1 to C30 alkylene group, or a C2 to C30 alkenylene group, or a C2 to C30 alkynylene group, for example, a C1 to C10 alkyl group, a C2 to C10 alkenyl group, a C2 to C10 alkynyl group, a C1 to C10 alkylene group, a C2 to C10 alkenylene group, or a C2 to C10 alkynylene group.

As used herein when a definition is not otherwise provided, the term "aromatic organic group" refers to a C6 to C30 group including one aromatic ring, two or more aromatic rings fused together to provide a condensed ring system, or two or more moieties independently selected from the foregoing (a single aromatic ring or a condensed ring system) linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$—, wherein 1≤p≤10, —(CF$_2$)$_q$—, wherein 1≤q≤10, —C(CH$_3$)$_2$—, —C(CF$_3$)$_2$—, and —C(=O)NH—, for example, through —S(=O)$_2$—, for example a C6 to C30 aryl group or a C6 to C30 arylene group, for example, a C6 to C16 aryl group such as phenyl or a C6 to C16 arylene group such as phenylene.

An optically transparent heat resistant polymer described herein may be applied to various optoelectronic devices, for example, an image device, a liquid crystal alignment layer, a color filter, an optical compensation film, an optic fiber, a light guide, optical lens, and the like. In this regard, research efforts have been recently made to realize a substantially light and flexible display panel by replacing a fragile inorganic glass substrate (e.g., about 300 nanometers (nm) to about 700 millimeters (mm) thick) in an image device with a polymeric substrate (<about 50 mm thick).

However, it is difficult to simultaneously accomplish optical transmittance, heat resistance, dimensional stability (thermal dimensional stability) at a thermal cycle during the assembly process of a device, film flexibility, and film-forming process compatibility (a solution process) at a high level. The polymeric substrate described herein is excellent in terms of flexibility and ability to form thin films but inferior in terms of heat resistance and thermal dimensional stability compared with the inorganic glass substrate.

Aromatic polyimides (PI) are well known as high performance materials for their excellent thermal stabilities and balanced mechanical and electrical properties, and thus, may be considered as the prospective candidates for materials in optoelectronics. Another interesting property of aromatic polyimide films is structural anisotropy. Since aromatic polyimide molecules tend to align parallel to the film surface during the film casting process, the in-plane refractive index is larger than the out-of-plane refractive index. The degree of in-plane orientation and the resultant optical anisotropy can be estimated by the birefringence which is the difference in the refractive indices along the in-plane and out-of-plane directions. This linear optical anisotropy of polyimide films makes them suitable for compensators in liquid crystal displays.

However, common applications of PIs are limited due to their color caused by the strong intra- and intermolecular charge transfer (CT) interactions and insolubility, making them difficult to process. The most effective approach for inhibiting CT interactions is to use cycloaliphatic monomers either in diamines or tetracarboxylic dianhydrides. Unfortunately, however, this approach somewhat sacrifices high-temperature stability. For fully aromatic polyimides, one way is to incorporate a trifluoromethyl group in the monomers, such as, for example, 4,4'-(hexafluoroisopropylidene) diphthalic anhydride (6-FDA) and 2,2'-bis(trifluoromethyl) biphenyl-4,4'-diamine (TFDB), which are commercially available but expensive. Another approach to increase solubility and processability of PIs without scarifying their thermal stability may be the synthesis of copolyamides such as, for example, poly(ether-imides), poly(ester-imides) (PEIs), poly(amide-imides), and the like. However, poly (ether imides) based on bis(ether anhydrides) decrease birefringence of films due to the introduction of flexible ether linkage. On the other hand, introduction of an ester group into a polyimide leads to PEIs with high birefringence, low water absorption, and better solubility, compared with poly (amide-imides).

Hasegawa et al. synthesized a series of PEIs with low water absorption and high birefringence, and studied effects of different alkyl substituents on the properties (M. Hasegawa, T Ishigami, J. Ishii. Polymer, 74, 1-15 (2015)). The inventors have synthesized a novel ester bond-containing dianhydride having various substituents as disclosed in Korean Patent Application No.: 10-2017-0096550, the entirety of which is incorporated herein by reference, and discovered that a PEI prepared from the novel dianhydrides had excellent optical properties and high out-of-plane birefringence. While the PEIs show a low glass transition temperature by having bulky substituents, they also have a lowered out-of-plane birefringence.

An approach that may be used to control the Tg of a polyimide is by lowering its molecular weight. In this case, however, the out-of-plane birefringence may also decrease. A flexible isopropylidene unit improved the solubility of a polyimide and lowered the Tg of the polyimide, and it has been known that the Tg may be controlled by changing the amount of isopropylidene-containing monomer in a composition for preparing a polyimide (X. Tian et al. Ind. J. Chem Technol. 19, 271-277 (2012). Introduction of a long chain alkyl substituent may also decrease Tg, but in this case, the thermal stability or coefficient of thermal expansion (CTE) of the polyimide may deteriorate. Another way to control Tg of a polyimide may be incorporation of a flexible alkyl chain into the polyimide's main chain. Partially aliphatic polyimides were synthesized by using dodecyldiamine, and it has been known that as the aliphatic content increases, Tg, thermal stability, refractive index, and the dielectric constant of the polyimide may decrease, but CTE may increase (A. E. Eichstadt et al. J. Polym. Sci. B. 40, 1503-1512 (2002)).

That is, although researchers have attempted to develop a polyimide having excellent optical properties and high heat resistance, as well as a high out-of-plane birefringence and a low Tg that can easily dissolve in solvents, and thus have high processibility, a polymeric material simultaneously having the desired various characteristics, and thus, having high reliability is difficult to develop.

The present inventors synthesized a polymer simultaneously having excellent optical properties and thermal stability, as well as high out-of-plane birefringence, and in addition, Tg that can easily dissolve in solvents, and thus have high processibility. That is, the polymer according to an embodiment may be a polyamic acid represented by Chemical Formula 1 or a polyimide represented by Chemical Formula 2, wherein each two ends thereof are capped with an alkyl amino group substituted with $R^3$, wherein, $R^3$ may be hydrogen, a halogen, a vinyl group, an ethynyl group, an isopropyl group, a sec-butyl group, a tert-butyl group, C3-C20 cycloalkyl group (e.g., a cyclopropyl group, a cyclobutyl group, a cyclopentyl group, a cyclohexyl group, a cycloheptyl group, a cyclooctyl group, a cyclononyl group, a cyclodecyl group), C6-C20 aryl group (e.g., a phenyl group), or a combination thereof:

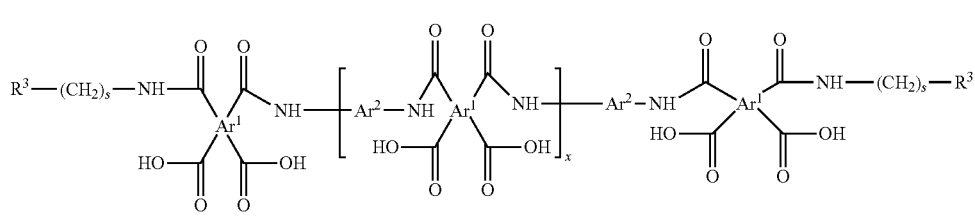

Chemical Formula 1

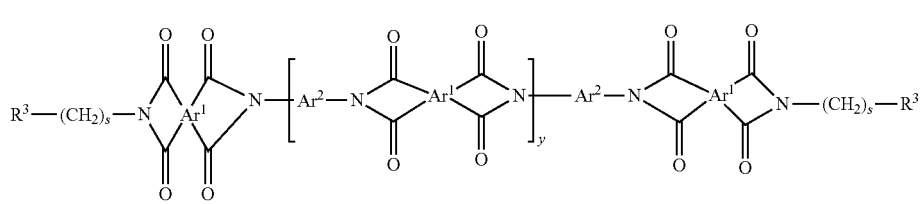

Chemical Formula 2 wherein, in Chemical Formula 1 and Chemical Formula 2,
$Ar^1$ is a substituted or unsubstituted C6 to C30 aromatic organic group, a group represented by Chemical Formula 3, a group represented by Chemical Formula 4, or a combination thereof:

Chemical Formula 3

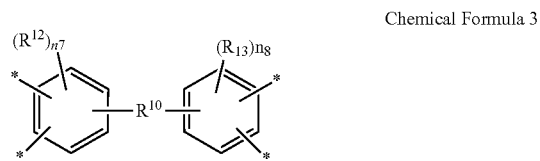

wherein, in Chemical Formula 3,
$R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, or —(CH$_2$)$_p$—C(C$_n$F$_{2n+1}$)$_2$—(CH$_2$)$_q$— (wherein 1≤n≤10, 1≤p≤10, and 1≤q≤10),
$R^{12}$ and $R^{13}$ are independently a halogen, a hydroxy group, a substituted or unsubstituted C1 to C10 aliphatic organic group, a substituted or unsubstituted C6 to C20 aromatic organic group, a —OR$^{201}$ group (wherein R$^{201}$ is a C1 to C10 aliphatic organic group), or a —SiR$^{210}$R$^{211}$R$^{212}$ (wherein R$^{210}$, R$^{211}$, and R$^{212}$ are independently hydrogen or a C1 to C10 aliphatic organic group) group, and
n7 and n8 are independently one of integers of 0 to 3;

Chemical Formula 4

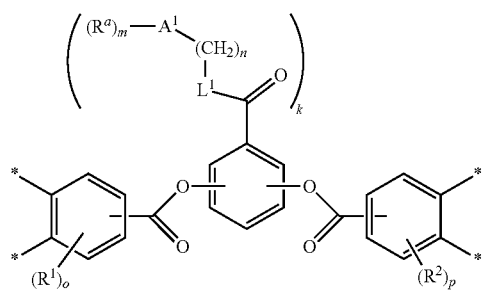

wherein, in Chemical Formula 4,
$R^1$ and $R^2$ are independently a substituted or unsubstituted C1 to C30 alkyl group, a substituted or unsubstituted C3 to C30 cycloalkyl group, a substituted or unsubstituted C1 to C30 alkoxy group, a substituted or unsubstituted C6 to C30 aryl group, a substituted or unsubstituted C2 to C30 acyl group, a hydroxy group, a halogen, a nitro group, —NR'R" (wherein R' and R" are independently hydrogen, a C1 to C30 alkyl group, or a C6 to C30 aryl group), —SiR'R"R'" (wherein R', R", and R'" are independently hydrogen, a C1 to C30 alkyl group, or a C6 to C30 aryl group), or a combination thereof,
$L^1$ is O or NR$^b$ (wherein R$^b$ is hydrogen or a C1 to C20 alkyl group),
$A^1$ is a C6 to C30 aromatic organic group, and
$R^a$ is hydrogen, a substituted or unsubstituted C1 to C30 alkyl group, a substituted or unsubstituted C1 to C30 alkoxy group, a substituted or unsubstituted C3 to C30 cycloalkyl group, a substituted or unsubstituted C6 to C30 aryl group, a substituted or unsubstituted C7 to C30 arylalkyl group, a hydroxy group, a halogen, a nitro group, —NR'R" (wherein R' and R" are independently hydrogen, a C01 to C30 alkyl group, a C6 to C30 aryl group, or a C7 to C30 arylalkyl group), —CO—NR'R" (wherein R' and R" are independently hydrogen, a C1 to C30 alkyl group, a C6 to C30 aryl group, or a C7 to C30 arylalkyl group), —SiR'R"R'" (wherein R', R", and R'" are independently hydrogen, a C1 to C30 alkyl group, a C6 to C30 aryl group, or a C7 to C30 arylalkyl group), or a group represented by Chemical Formula 5:

Chemical Formula 5

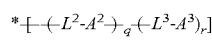

wherein, in Chemical Formula 5,
$L^2$ and $L^3$ are independently O, CO, COO, C≡C, or CONR$^b$ (wherein R$^b$ is hydrogen or a C1 to C30 alkyl group),
$A^2$ and $A^3$ are independently a substituted or unsubstituted C6 to C30 aromatic ring, a substituted or unsubstituted fluorene ring, or a substituted or unsubstituted C7 to C30 arylalkylene or arylalkyl group,
q and r are independently an integer ranging from 0 to 3,
k is an integer ranging from 0 to 2,
m is an integer ranging from 0 to 3,
n is an integer ranging from 0 to 20, and
o and p are independently an integer ranging from 0 to 3;
$Ar^2$ is a substituted or unsubstituted C6 to C30 aromatic organic group, wherein the substituted or unsubstituted C6 to C30 aromatic organic group is present as a substituted or unsubstituted single aromatic ring; a fused ring comprising two or more substituted or unsubstituted aromatic rings; or a ring system comprising two or more of the substituted or unsubstituted single aromatic ring and/or the fused ring that are linked by a single bond, or a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof;

R$^3$ is hydrogen, a halogen, a vinyl group, an ethynyl group, an isopropyl group, a sec-butyl group, a tert-butyl group, a C3 to C20 cycloalkyl group, a C6 to C20 aryl group, or a combination thereof;

s is an integer ranging from 1 to 30, and x and y are independently an integer greater than or equal to 1.

The polyamic acid represented by Chemical Formula 1 is a precursor of the polyimide represented by Chemical Formula 2. That is, the polyamic acid represented by Chemical Formula 1 may be imidized to a polyimide represented by Chemical Formula 2 by a thermal or a chemical imidization method, which is known in the art. Accordingly, the polyamic acid and polyimide may have the same composition in the polymer, but differ in whether they are imidized.

As described above, the polyamic acid represented by Chemical Formula 1 or the polyimide represented by Chemical Formula 2, according to an embodiment, has two ends thereof capped with R$^3$—(CH$_2$)s-NH—, wherein, R$^3$ is a hydrogen, a halogen, a vinyl group, an ethynyl group, an isopropyl group, a sec-butyl group, a tert-butyl group, C3-C20 cycloalkyl group (e.g., a cyclopropyl group, a cyclobutyl group, a cyclopentyl group, a cyclohexyl group, a cycloheptyl group, a cyclooctyl group, a cyclononyl group, a cyclodecyl group), C6-C20 aryl group (e.g., a phenyl group), or a combination thereof, and the like. An article prepared from the polyamic acid or polyimide, according to an embodiment, has an unexpectedly lowered glass transition temperature (T$_g$), while maintaining equivalent optical properties, such as, for example, transmittance, yellowness index, haze, and out-of-plane birefringence, and heat resistance, such as, for example, a weight-loss temperature (T$_d$), compared with an article prepared from other polyamic acids or polyimides, which does not have the two ends capped with R$^3$—(CH$_2$)s-NH—. That is, the polyamic acid represented by Chemical Formula 1 or the polyimide represented by Chemical Formula 2, according to an embodiment, having two ends thereof capped with R$^3$—(CH$_2$)s-NH— may simultaneously have excellent optical properties, high thermal stability, high out-of-plane birefringence, as well as a lowered glass transition temperature (T$_g$), and excellent processability.

The polymer, according to an embodiment, has unexpected effects in having a drastically lowered glass transition temperature (T$_g$), while maintaining excellent optical properties, thermal stability, and an out-of-plane birefringence of a conventional polyimide, which was not expected from conventional methods for lowering glass transition temperature (T$_g$), wherein by lowering molecular weight of the polymer, incorporating an aliphatic group into the main chain of the polymer, or by incorporating a long chain alkyl substituent to the main chain or a polymer, which results in deterioration of birefringence and/or thermal stability of a film due to a lowered T$_g$, but as well as a lowered out-of-plane birefringence, a lowered weight-loss temperature (T$_d$).

This surprising effect of the polymer according to an embodiment would have not been expected by persons skilled in the art before the filing date of the present application. Without wanting to be bound to a specific theory, the properties of the polymer, according to an embodiment, may be obtained by the end-capper R$^3$—(CH$_2$)s-NH— group, which may play a role as a plasticizer. As proved by the Examples later-described, the polymer, according to an embodiment, may have high processibility due to high solubility in solvent, even when its molecular weight is in a range of about 1,000 gram per mole (g/mol) to about 100,000 g/mol, excellent optical properties and thermal stability, as well as a high out-of-plane birefringence, and thus may be advantageously used to manufacture a compensation film.

In an exemplary embodiment, in Chemical Formula 1 and Chemical Formula 2, Ar$^1$ may be a substituted or unsubstituted C6 to C30 aromatic organic group, a group represented by Chemical Formula 3, wherein two substituted or unsubstituted benzene rings are linked through a single bond or a specific linking group, or a group represented by Chemical Formula 4, wherein two substituted or unsubstituted benzene rings are linked though an additional benzene ring, which is substituted or unsubstituted and is linked to each of the two benzene rings though an ester bond, and each of the Ar$^1$ may be the same or different in each structural unit of the polymer. When the Ar$^1$ is a substituted or unsubstituted C6 to C30 aromatic organic group, and/or the group represented by Chemical Formula 3, the polymer may be a poly(amic-acid) or a polyimide, and when the Ar$^1$ is or further includes the group represented by Chemical Formula 4, the polymer may be a poly(ester-imide) or a poly(ester-amic acid).

As shown from the structures of Chemical Formula 1 or Chemical Formula 2, Ar$^1$ may be derived from a tetracarboxylic dianhydride selected to prepare a polyamic acid or polyimide, and when Ar$^1$ is represented by Chemical Formula 4, it may be derived from a bis(tricarboxylic ester anhydride) having an additional aromatic ring between two benzene rings, attached to each via an ester bond.

When the Ar$^1$ is a substituted or unsubstituted C6 to C30 aromatic organic group, it may be a substituted or unsubstituted C6 to C30 single aromatic ring, or a substituted or unsubstituted C6 to C30 fused aromatic ring system.

In Chemical Formula 3, R$^{10}$ may be a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), or a combination thereof, for example, R$^{10}$ may be a single bond, —O—, —S—, —C(=O)—, —S(=O)$_2$—, —(CF$_3$)$_2$—, or a combination thereof, and for example, R$^{10}$ may be a single bond, —(CF$_3$)$_2$—, or a combination thereof.

In Chemical Formula 4, L$^1$ may be O, A$^1$ may be a substituted or unsubstituted C6 to C20 aromatic organic group, R$^a$ may be hydrogen, a substituted or unsubstituted C1 to C30 alkyl group, a substituted or unsubstituted C6 to C30 aryl group, a substituted or unsubstituted C7 to C30 arylalkyl group, a halogen, —NR'R", —CO—NR'R" (wherein R' and R" are independently hydrogen, a C1 to C30 alkyl group, a C6 to C30 aryl group, or a C7 to C30 arylalkyl group), or a group represented by Chemical Formula 5, k may be 0 or 1, m may be an integer ranging from 0 to 2, and n may be an integer ranging from 1 to 3.

In Chemical Formula 4, L$^1$ may be O, A$^1$ may be a substituted or unsubstituted C6 to C20 aromatic organic group, R$^a$ may be hydrogen, a substituted or unsubstituted C1 to C20 alkyl group, a substituted or unsubstituted C6 to C20 aryl group, a substituted or unsubstituted C7 to C20 arylalkyl group, a halogen, —CO—NR'R" (wherein R' and R" are independently hydrogen, a C1 to C20 alkyl group, a C6 to C20 aryl group, or a C7 to C20 arylalkyl group), or a combination thereof, k may be 1, m may be an integer ranging from 0 to 2, and n may be 1.

In Chemical Formula 5, $L^2$ and $L^3$ may independently be COO, C≡C, or CONR$^b$ (wherein R$^b$ is hydrogen or a C1 to C20 alkyl group), $A^2$ and $A^3$ may independently be a substituted or unsubstituted C6 to C20 aromatic ring, a substituted or unsubstituted fluorene ring, or a substituted or unsubstituted C7 to C20 arylalkylene or arylalkyl group, and q and r may independently be an integer ranging from 0 to 2, provided that 1≤q+r≤2.

As shown from the structures of Chemical Formula 1 and Chemical Formula 2, $Ar^2$ may be derived from a diamine selected to prepare a polyamic acid or a polyimide, and in an exemplary embodiment, $Ar^2$ may be a ring system including two substituted or unsubstituted C6 to C30 aromatic rings linked by a single bond, or a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof. In an exemplary embodiment, $Ar^2$ may be a ring system including two substituted or unsubstituted phenyl rings linked by a single bond, and for example, a ring system including two phenyl rings each substituted by a trifluoromethyl group and linked by a single bond.

In an exemplary embodiment, $Ar^1$ of Chemical Formula 1 and Chemical Formula 2 may include a combination of the group represented by Chemical Formula 3 and the group represented by Chemical Formula 4. As described above, Chemical Formula 3 represents a tetracarboxylic dianhydride having two aromatic rings linked by a single bond or a specific linking group, which may be appropriately selected from tetracarboxylic dianhydrides conventionally used to prepare a polyimide. In an exemplary embodiment, Chemical Formula 4 may include a substituted or unsubstituted additional phenyl ring between two aromatic rings attached through an ester bond, and the polyimide prepared by using the dianhydride having an ester bond is referred to as a "poly(ester-amic acid)" or "poly(ester-imide), which has a higher birefringence than the polyamic acid or polyimide that does not include the ester-bond.

When $Ar^1$ includes a combination of the group represented by Chemical Formula 3 and the group represented by Chemical Formula 4, the group represented by Chemical Formula 3 and the group represented by Chemical Formula 4 may be included in a mole ratio of 1:99 to 99:1. In an exemplary embodiment, the group represented by Chemical Formula 3 and the group represented by Chemical Formula 4 may be included in a mole ratio of 10:90 to 90:10, for example, 15:85 to 85:15, for example, 20:80 to 80:20, or for example, 25:75 to 75:25, but is not limited thereto, and the mole ratio may be adjusted considering the desired use or object.

When $Ar^1$ includes a combination of the group represented by Chemical Formula 3 and the group represented by Chemical Formula 4, $R^{10}$ of Chemical Formula 3 may be single bond, —C(CF$_3$)$_2$—, or a combination thereof, and in Chemical Formula 4, $L^1$ may be O, $A^1$ may be a phenyl ring, $R^a$ may be hydrogen, a C1 to C30 alkyl group, a C6 to C30 aryl group, or a C7 to C30 arylalkyl group, —F, —Cl, —NR'R", —CO—NR'R" (wherein R' and R" are independently hydrogen, a C1 to C30 alkyl group, a C6 to C30 aryl group, or a C7 to C30 arylalkyl group), or a group represented by Chemical Formula 5, k may be 0 or 1, m may be an integer ranging from 0 to 2, and n may be an integer ranging from 1 to 3, and are not limited thereto.

In Chemical Formulae 1 and 2, x and y represents the number of the amic acid or imide structural units of each polymer. Accordingly, x and y may be an integer greater than or equal to 1, for example, an integer greater than or equal to 10, for example, an integer greater than or equal to 100, or for example, an integer greater than or equal to 1,000, and are not limited thereto.

In an exemplary embodiment, the weight average molecular weight (Mw) of the polymer according to Chemical Formula 1 or Chemical Formula 2 may be from about 1,000 to about 100,000 g/mole, for example, from about 1,500 to about 100,000 g/mole, for example, from about 2,000 to about 80,000 g/mole, for example, from about 2,500 to about 70,000 g/mole, for example, from about 3,000 to about 60,000 g/mole, for example, from about 3,000 to about 50,000 g/mole, for example, from about 4,000 to about 50,000 g/mole, for example, from about 5,000 to about 50,000 g/mole, for example, from about 6,000 to about 50,000 g/mole, for example, from about 7,000 to about 50,000 g/mole, for example, from about 8,000 to about 50,000 g/mole, for example, from about 9,000 to about 50,000 g/mole, for example, from about 10,000 to about 50,000 g/mole, for example, from about 10,000 to about 45,000 g/mole, for example, from about 10,000 to about 40,000 g/mole, for example, from about 10,000 to about 35,000 g/mole, for example, from about 12,000 to about 35,000 g/mole, for example, from about 13,000 to about 35,000 g/mole, for example, from about 14,000 to about 35,000 g/mole, or for example, from about 15,000 to about 35,000 g/mole, and are not limited thereto.

In an exemplary embodiment, the number average molecular weight (Mn) of the polymer according to Chemical Formula 1 and Chemical Formula 2 may be from about 1,000 to about 50,000 g/mole, for example, from about 1,500 to about 40,000 g/mole, for example, from about 2,000 to about 40,000 g/mole, for example, from about 2,500 to about 40,000 g/mole, for example, from about 2,500 to about 35,000 g/mole, for example, from about 2,500 to about 30,000 g/mole, for example, from about 3,000 to about 30,000 g/mole, for example, from about 3,500 to about 30,000 g/mole, for example, from about 3,500 to about 25,000 g/mole, for example, from about 3,500 to about 20,000 g/mole, for example, from about 3,500 to about 18,000 g/mole, for example, from about 3,500 to about 17,000 g/mole, for example, from about 3,500 to about 15,000 g/mole, for example, from about 3,500 to about 13,000 g/mole, for example, from about 3,500 to about 12,000 g/mole, or for example, from about 4,000 to about 12,000 g/mole, and are not limited thereto.

When a weight average molecular weight or a number average molecular weight of the polymer according to Chemical Formula 1 and Chemical Formula 2 is within the above range, excellent optical properties, good thermal stability, high birefringence, and good solubility may be realized.

While the polymer according to an embodiment may be synthesized by condensation polymerization of a diamine and a dianhydride in a mole ratio of about 1:1 in a polar solvent, in addition to this, in order to cap the ends of the polymer with the group "$R^3$—(CH$_2$)s-NH—", wherein $R^3$ and s are the same as defined above, an additional monoamine represented by "$R^3$—(CH$_2$)s-NH$_2$", wherein $R^3$ and s are the same as defined above, may further be added to react with the dianhydride. In an exemplary embodiment, the polyamic acid or polyimide according to an embodiment may be synthesized by firstly dissolving a diamine in a polar solvent, and adding thereto a dianhydride to react with the diamine to be polymerized, provided that the dianhydride is added in excess for the polyamic acid prepared to have an anhydride group at each end. Upon completion of the condensation polymerization reaction, a polyamic acid having anhydride groups at two ends is prepared, and the monoamine represented by "$R^3$—$(CH_2)s$-$NH_2$", wherein $R^3$ and s are the same as defined above, is added thereto to react with the anhydride ends of the polyamic acid to cap the ends thereof with a substituted or unsubstituted alkyl amino group to prepare a polyamic acid represented by Chemical Formula 1. Further, the polyamic acid represented by Chemical Formula 1 may be imidized using heat or a chemical imidization agent to be become the polyimide represented by Chemical Formula 2.

In an exemplary embodiment, a mole ratio of the dianhydride and the diamine used to prepare the polymer according to an embodiment may be about 1:0.8 to 0.95.

In an exemplary embodiment, the polymer according to an embodiment may be a prepared by condensing polymerizing at least one dianhydride selected from a tetracarboxylic dianhydride having a substituted or unsubstituted C6 to C30 aromatic ring group, a dianhydride represented by Chemical Formula 7, and a dianhydride represented by Chemical Formula 8, a diamine represented by Chemical Formula 9, and a monoamine represented by Chemical Formula 10 in a polar aprotic solvent:

Chemical Formula 7

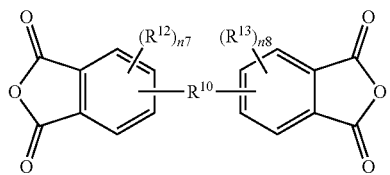

wherein, in Chemical Formula 7,
$R^{10}$, $R^{12}$, $R^{13}$ n7 and n8 are the same as defined in Chemical Formula 3;

In an exemplary embodiment, the dianhydride represented by Chemical Formula 7 may include at least one of the dianhydride represented by Chemical Formula 7-1, and the dianhydride represented by Chemical Formula 7-2:

Chemical Formula 7-1

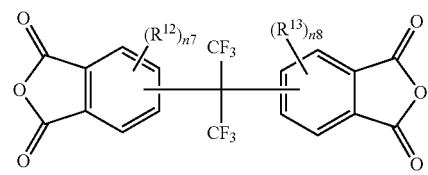

Chemical Formula 7-2

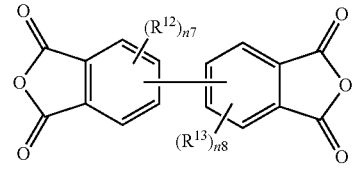

wherein, in Chemical Formula 7-1 and Chemical Formula 7-2,
$R^{12}$, $R^{13}$, n7, and n8 are the same as defined in Chemical Formula 3.

In an exemplary embodiment, both of n7 and n8 of Chemical Formula 7-1 and Chemical Formula 7-2 may be 0.

In an exemplary embodiment, the dianhydride represented by Chemical Formula 8 may include at least one of the dianhydride represented by Chemical Formulae 8-1 to 8-4:

Chemical Formula 8

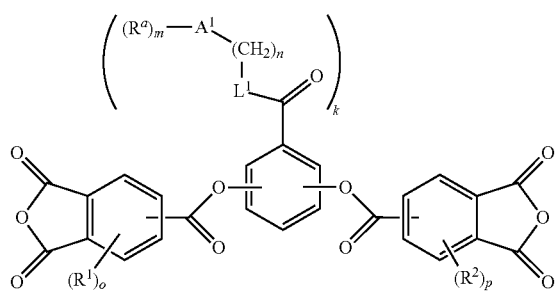

wherein, in Chemical Formula 8
$R^1$, $R^2$, $R^a$, $A^1$, $L^1$, k, m, n, o, and p are the same as defined in Chemical Formula 4;

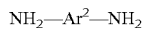  Chemical Formula 9 wherein, in Chemical Formula 9,
$Ar^2$ is the same as defined in Chemical Formula 1 and Chemical Formula 2;

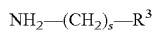  Chemical Formula 10 wherein, in Chemical Formula 10,
$R^3$ is hydrogen, a halogen, a vinyl group, an ethynyl group, an isopropyl group, a sec-butyl group, a tert-butyl group, a C3 to C20 cycloalkyl group, a C6 to C20 aryl group, or a combination thereof,
s is an integer ranging from 1 to 30.

Chemical Formula 8-1

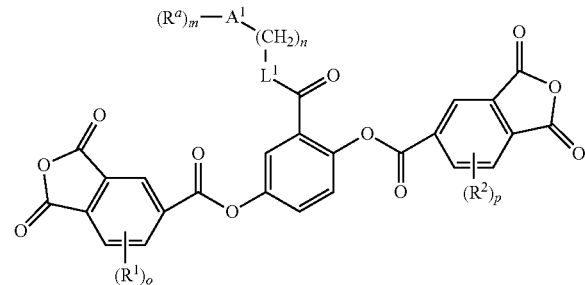

Chemical Formula 8-2

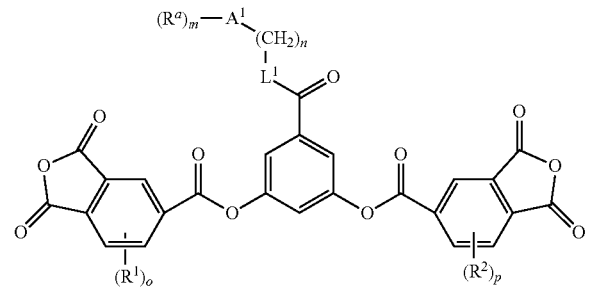

-continued

Chemical Formula 8-3

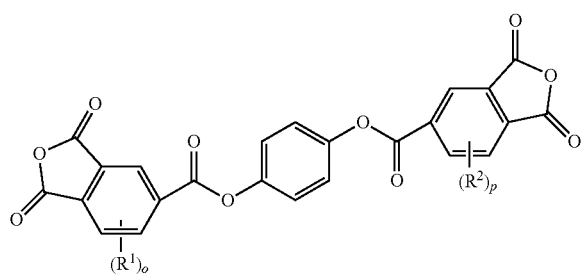

Chemical Formula 8-4

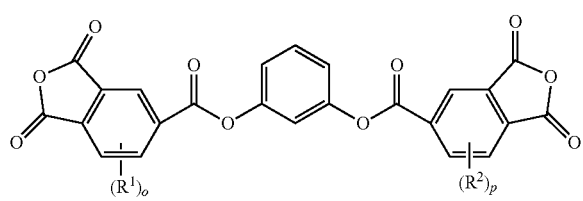

wherein, in Chemical Formula 8-1 to Chemical Formula 8-4, $R^1$, $R^2$, $R^a$, $A^1$, $L^1$, m, n, o, and p are the same as defined in Chemical Formula 4.

The dianhydride represented by Chemical Formula 8-1 or by Chemical Formula 8-2 has a rigid planar structure overall by including a core having two dianhydride groups attached to the core by an ester bond, but also includes a bulky substituent at a side chain of the core, and thus, has a higher molecular volume and an asymmetric structure, whereby improving solubility and optical properties of the polymer prepared therefrom by preventing or reducing the formation of intermolecular lamination structures or a charge-transfer-complex of the polymer.

In an exemplary embodiment, both o and p of Chemical Formulae 8-1 to 8-4 may be 0, $L^1$ may be O or $NR^b$ (wherein $R^b$ is hydrogen or a C1 to C20 alkyl group), for example, O or NH, or for example, may be O, $A^1$ may be a C6 to C30 aromatic organic group, for example, a C6 to C20 aromatic organic group, for example, a C6 to C12 aromatic organic group, for example, a C6 to C10 aromatic organic group, or for example, may be a phenyl or phenylene group, $R^a$ may be hydrogen, a substituted or unsubstituted C1 to C20 alkyl group, a substituted or unsubstituted C1 to C20 alkoxy group, a substituted or unsubstituted C7 to C20 arylalkyl group, a halogen, —NR'R"—CO—NR'R" (wherein R' and R" are independently hydrogen, a C1 to C30 alkyl group, a C6 to C30 aryl group, or a C7 to C30 arylalkyl group), —SiR'R"R'" (wherein R', R", and R'" are independently hydrogen, or a C1 to C20 alkyl group), or a group represented by Chemical Formula 5:

Chemical Formula 5

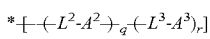

wherein, in Chemical Formula 5, $L^2$ and $L^3$ may be independently O, CO, COO, C≡C, or $CONR^b$ (wherein $R^b$ is hydrogen or C1 to C20 alkyl group), for example, COO, C≡C, or $CONR^b$ (wherein $R^b$ is hydrogen or C1 to C20 alkyl group), or for example, COO, C≡C, or CONH, $A^2$ and $A^3$ are independently a substituted or unsubstituted C6 to C20 aromatic ring, for example, a substituted or unsubstituted C6 to C16 aromatic ring, for example, a substituted or unsubstituted C6 to C12 aromatic ring, or for example, a benzene ring, a substituted or unsubstituted fluorene ring, or a substituted or unsubstituted C7 to C20 arylalkylene or arylalkyl group, for example, a substituted or unsubstituted phenylalkylene or phenylalkyl group, for example, phenylmethylene or phenylmethyl group, phenylethylene or phenylethyl group, phenylpropylene or phenylpropyl group, phenylbutylene or phenylbutyl group, or a phenylpentylene or phenylpentyl group, q and r may be independently an integer ranging from 0 to 2, provided that 1≤q+r≤2, m may be an integer ranging from 0 to 2, for example, may be 0 or 1, and n is an integer ranging from 0 to 10, for example, an integer ranging from 0 to 5, for example, an integer ranging from 0 to 3, or for example, an integer ranging from 0 to 2.

The compound represented by Chemical Formula 8-1 or Chemical Formula 8-2 may be the compound represented by Chemical Formulae M-1 to M-20, but are not limited thereto:

Compound M-1

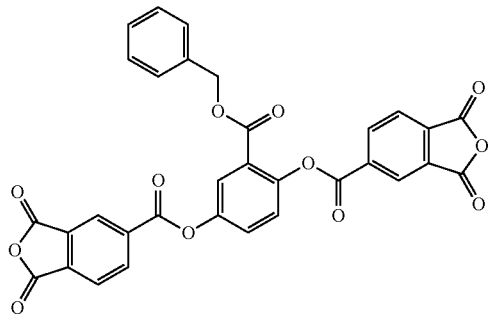

Compound M-2

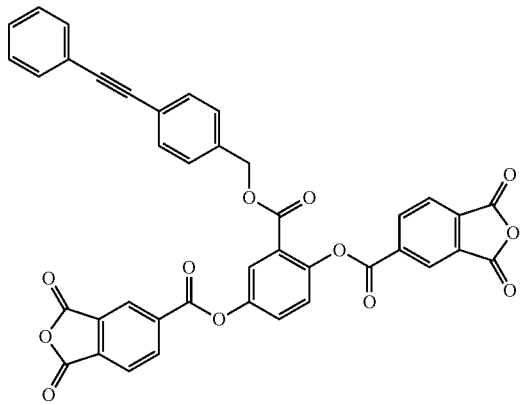

Compound M-3
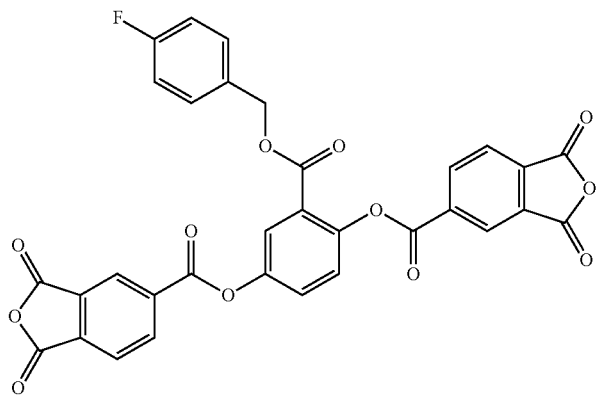
Compound M-4
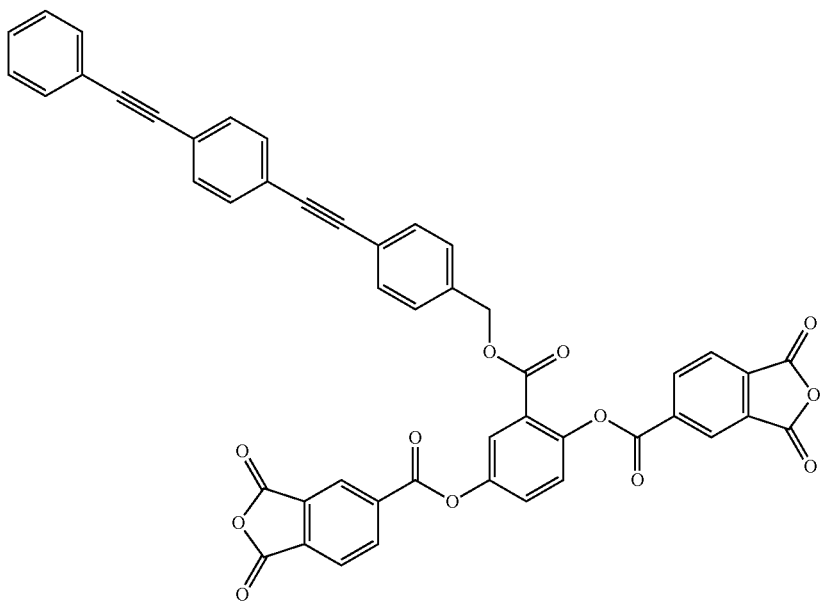
Compound M-5
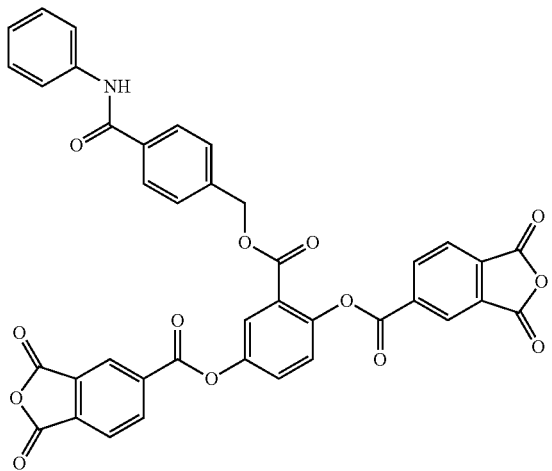
Compound M-6
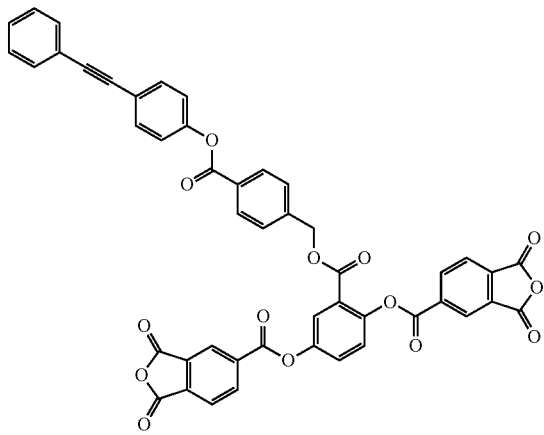

-continued
Compound M-7
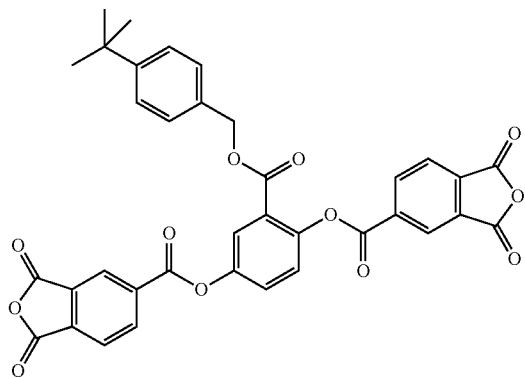
Compound M-8
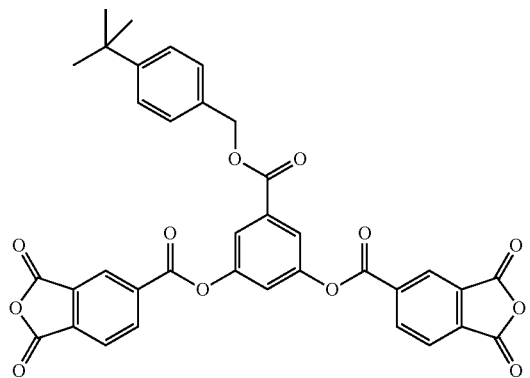
Compound M-9
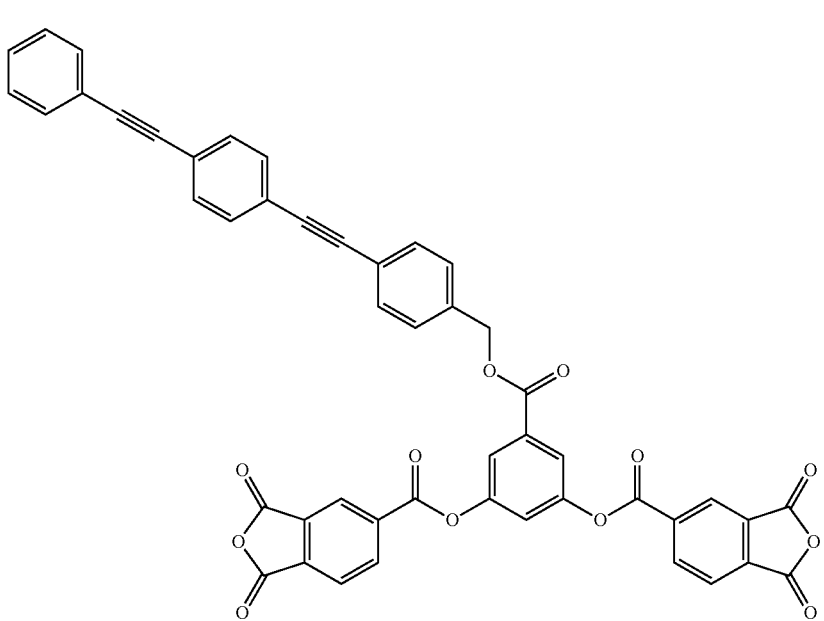
Compound M-10
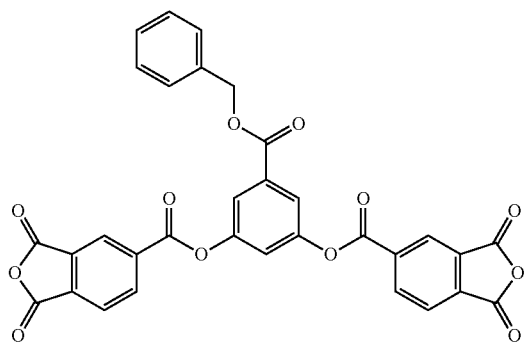
Compound M-11
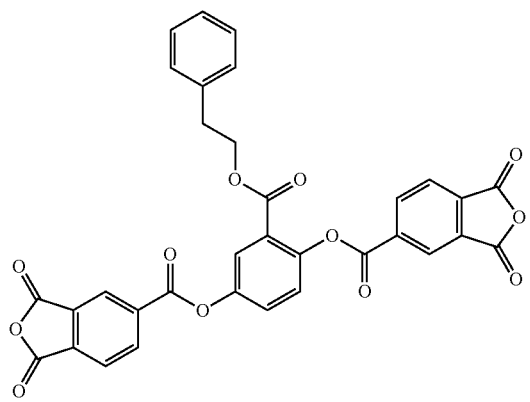

Compound M-12
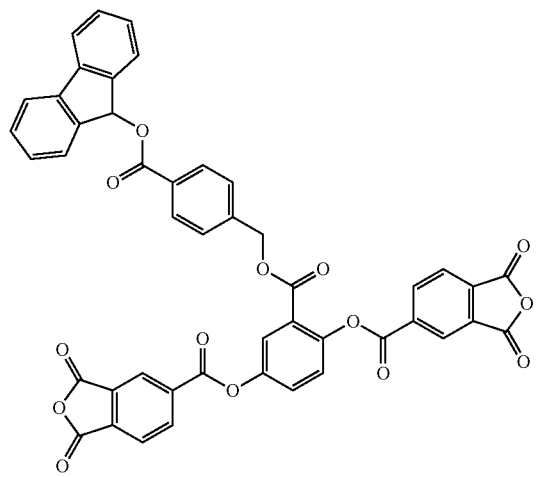
Compound M-13
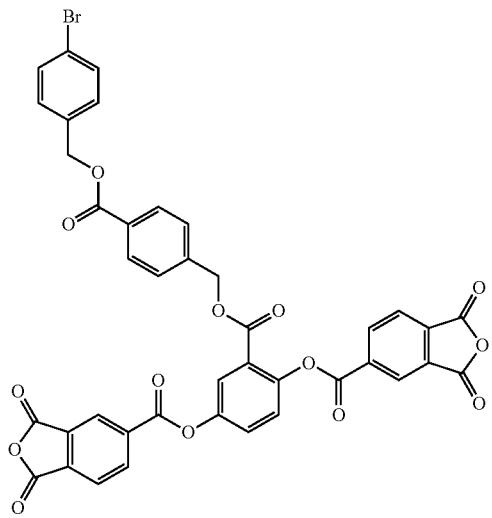
Compound M-14
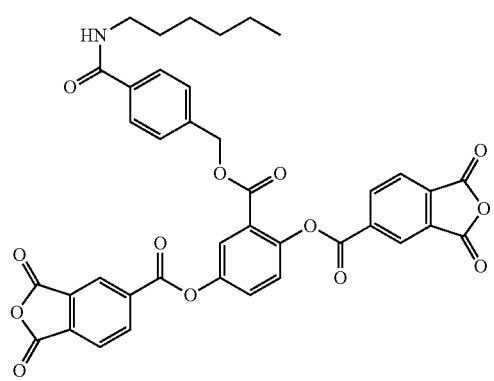
Compound M-15
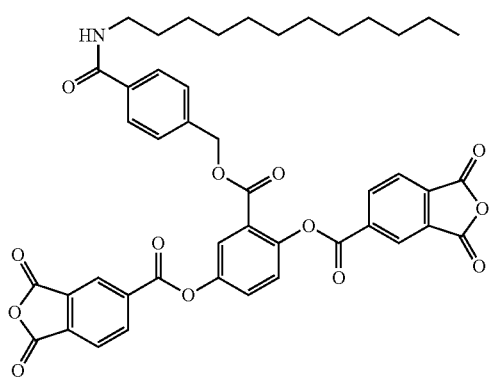
Compound M-16
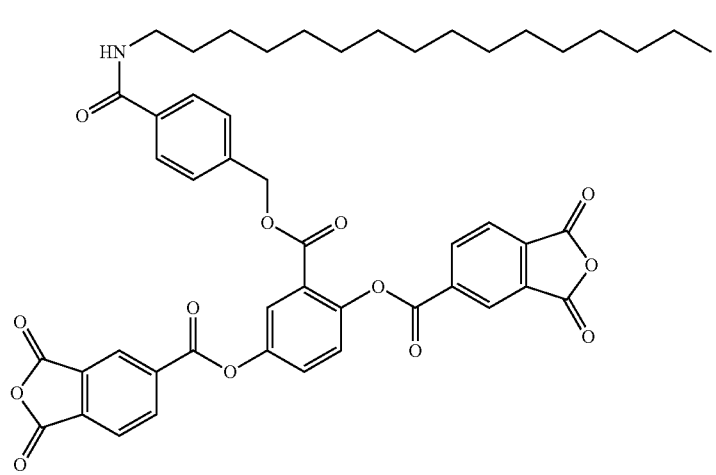

-continued

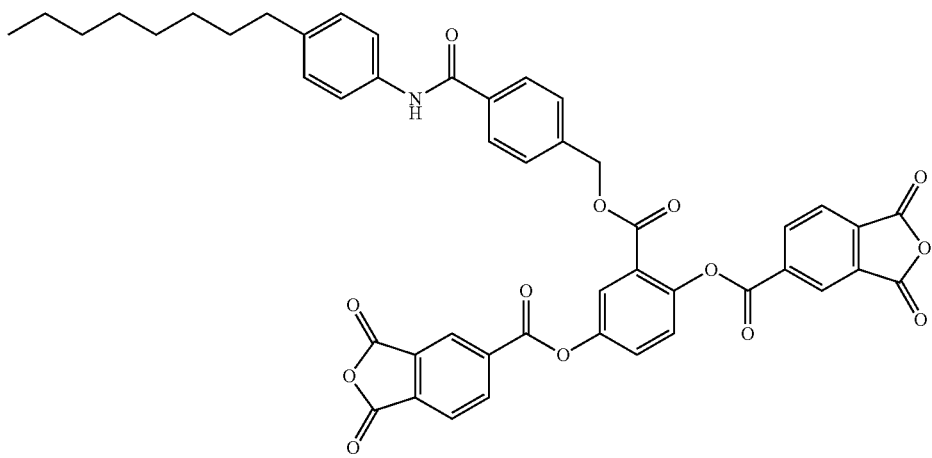
Compound M-17

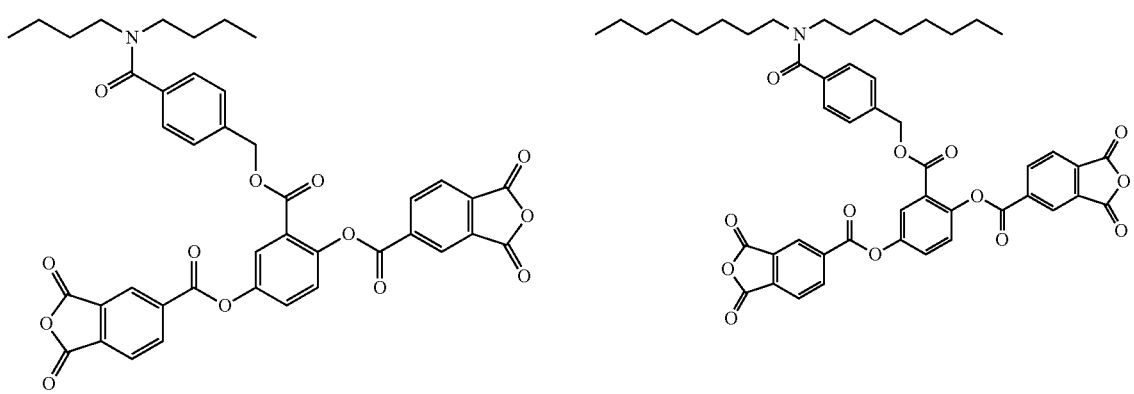
Compound M-18                                   Compound M-19

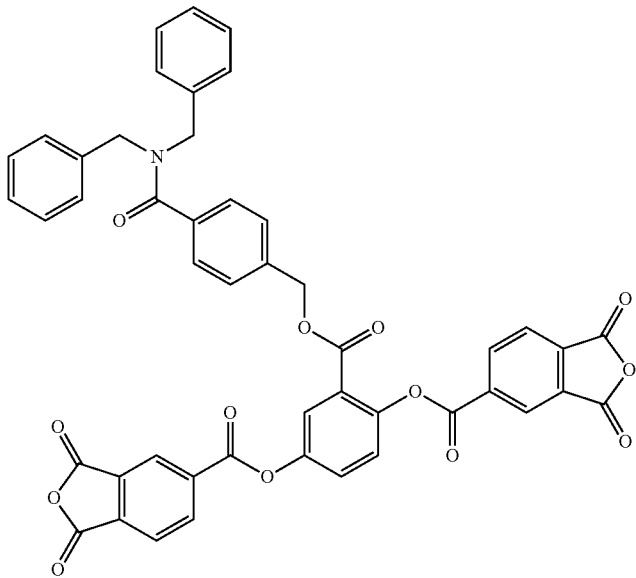
Compound M-20

A method of preparing the compound represented by Chemical Formula 8 is disclosed in detail in Korean Patent Application No. 10-2017-0096550, which is incorporated herein in its entirety by reference. The dianhydride may be easily prepared by referring to the Korean Patent Application by one of ordinary skill in the art by using an inexpensive commercially available compound as a starting material. Accordingly, the method for preparing the compound represented by Chemical Formula 8 is omitted herein.

The diamine represented by Chemical Formula 9 may be represented by at least one of Chemical Formula 11 to Chemical Formula 13:

Chemical Formula 11

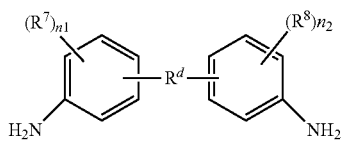

In Chemical Formula 11,
$R^d$ is selected from the following chemical formulae:

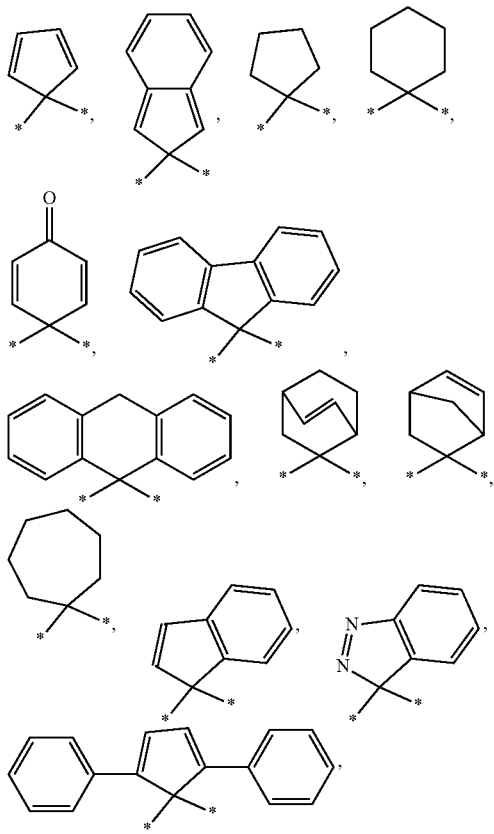

$R^7$ and $R^8$ are the same or different and are independently a halogen, a hydroxy group, an alkoxy group (—$OR^{200}$, wherein $R^{200}$ is a C1 to C10 aliphatic organic group), a silyl group (—$SiR^{201}R^{202}R^{203}$, wherein $R^{201}$, $R^{202}$, and $R^{203}$ are the same or different and are independently hydrogen, or a C1 to C10 aliphatic organic group), a substituted or unsubstituted C1 to C10 aliphatic organic group, or a substituted or unsubstituted C6 to C20 aromatic organic group, and n1 and n2 are independently an integer ranging from 0 to 4;

Chemical Formula 12

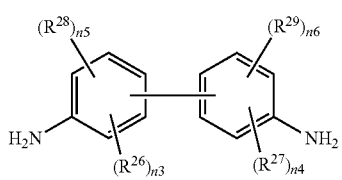

wherein, in Chemical Formula 12,
$R^{26}$ and $R^{27}$ are the same or different and are independently an electron withdrawing group selected from —$CF_3$, —$CCl_3$, —$CBr_3$, $Cl_3$, —$NO_2$, —CN, —$COCH_3$, or —$CO_2C_2H_5$, $R^{28}$ and $R^{29}$ are the same or different and are independently a halogen, a hydroxy group, an alkoxy group (—$OR^{204}$, wherein $R^{204}$ is a C1 to C10 aliphatic organic group), a silyl group (—$SiR^{205}R^{206}R^{207}$, wherein $R^{205}$, $R^{206}$, and $R^{207}$ are the same or different and are independently hydrogen, or a C1 to C10 aliphatic organic group), a substituted or unsubstituted C1 to C10 aliphatic organic group, or a substituted or unsubstituted C6 to C20 aromatic organic group, n3 is an integer ranging from 1 to 4, n5 is an integer ranging from 0 to 3, and n3+n5 is an integer ranging from 1 to 4, n4 is an integer ranging from 1 to 4, n6 is an integer ranging from 0 to 3, and n4+n6 is an integer ranging from 1 to 4;

Chemical Formula 13

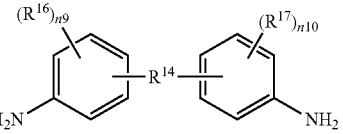

wherein, in Chemical Formula 13,
$R^{14}$ is O, S, C(=O), CH(OH), S(=O)$_2$, Si(CH$_3$)$_2$, (CH$_2$)$_p$ (wherein, 1≤p≤10), (CF$_2$)$_q$ (wherein, 1≤q≤10), C(CH$_3$)$_2$, C(CF$_3$)$_2$, C(=O)NH, or a substituted or unsubstituted C6 to C30 aromatic organic group, wherein the C6 to C30 aromatic organic group is present as a single aromatic ring, a fused ring including two or more aromatic rings, or a ring system including two or more of the single aromatic ring and/or the fused ring linked by a single bond, or a fluorenylene group, O, S, C(=O), CH(OH), S(=O)$_2$, Si(CH$_3$)$_2$, (CH$_2$)$_p$ (wherein, 1≤p≤10), (CF$_2$)$_q$ (wherein, 1≤q≤10), C(CH$_3$)$_2$, C(CF$_3$)$_2$, or C(=O)NH, $R^{16}$ and $R^{17}$ are the same or different and are independently a halogen, a hydroxy group, an alkoxy group (—$OR^{212}$, wherein $R^{212}$ is a C1 to C10 aliphatic organic group), a silyl group (—$SiR^{213}R^{214}R^{215}$, wherein $R^{213}$, $R^{214}$, and $R^{215}$ are the same or different and are independently hydrogen or a C1 to C10 aliphatic organic group), a substituted or unsubstituted C1 to C10 aliphatic organic group, or a substituted or unsubstituted C6 to C20 aromatic organic group, and n9 and n10 are independently an integer ranging from 0 to 4.

In an exemplary embodiment, the diamine represented by Chemical Formula 9 may include a diamine represented by Chemical Formula 12, wherein both $R^{26}$ and $R^{27}$ are —$CF_3$, both n3 and n4 are 1, and both n5 and n6 are 0. That is, the diamine may be TFDB.

In exemplary embodiments, the monoamine represented by Chemical Formula 10 includes n-butylamine, arylamine, phenylbutylamine, octylamine, dodecylamine, hexadecylamine, and the like, and are not limited thereto. The monoamine may be included as one compound or a combination of two or more compounds.

As described above, a molar ratio between the total dianhydride and the diamine to prepare to the polymer according to an embodiment may be about 1:0.8 to 0.95, for example, about 1:0.8 to 0.9.

Further, a molar ratio between the total dianhydride and the monoamine represented by Chemical Formula 10 to prepare to the polymer according to an embodiment may be about 1:0.1 to 0.4, for example, about 1:0.15 to 0.35, or for example, about 1:0.2 to 0.3.

By reacting the dianhydride and diamine, and the monoamine within the above range, the polyamic acid or polyimide of which two ends are capped with $R^3$—$(CH_2)s$-NH— groups, results according to an embodiment. The polyamic acid or polyimide has excellent optical properties, high thermal stability, and high birefringence, as well as good solubility in solvent due to low glass transition temperature, and has good processability. Accordingly, the polymer according to an embodiment may be advantageously used as an optical film, such as, for example, a compensation film.

A film formed of the polymer according to an embodiment may have a high light transmittance of greater than or equal to about 89 percent (%) at the wavelength range of from 360 nanometers (nm) to 700 nm, and of greater than or equal to about 88% even at 450 nm. The film may have a very low yellowness index of less than or equal to about 1.5%, for example, of less than or equal to about 1.0%, and a low haze of less than or equal to about 0.5%.

A film formed of the polymer according to an embodiment may have a high glass transition temperature of about 160° C. to about 200° C., when measured by using a thermal mechanical analyzer TMA Q400 of TA Instruments while heating from 50° C. to 400° C. at a heating rate of 5° C./minute, as well as applying 0.05 N of tensile strength. When a polymer has a glass transition temperature of the above range, the polymer has good processability, such as, for example, coatability, due to high solubility in solvent.

In addition, the film formed of the polymer according to an embodiment may have a high out-of-plane birefringence, for example, greater than about 0.05 micrometers (μm) at a thin film thickness of less than or equal to about 100 μm, for example, less than or equal to about 90 μm, for example, less than or equal to about 80 μm, for example, less than or equal to about 70 μm, for example, less than or equal to about 60 μm, for example, less than or equal to about 50 μm, for example, less than or equal to about 40 μm, for example, less than or equal to about 30 μm, for example, less than or equal to about 20 μm. Accordingly, the film may be advantageously used as a compensation film.

When the film is used as a compensation film, the compensation film may have a predetermined retardation by changing a refractive index and a thickness of the film.

A retardation (R) of the compensation film may be represented by an in-plane retardation ($R_o$) and a thickness direction retardation ($R_{th}$). The in-plane retardation ($R_o$) of compensation film is a retardation generated in in-plane of the compensation film and may be represented by $R_o=(n_x-n_y)d$. The thickness direction retardation ($R_{th}$) of the compensation film is a retardation generated in a thickness direction of the compensation film and may be represented by $R_{th}=\{[(n_x+n_y)/2]-n_z\}d$. Herein, $n_x$ is a refractive index in a direction having a highest in-plane refractive index in a plane of the compensation film (hereinafter, referred to as a 'slow axis'), $n_y$ is a refractive index in a direction having a lowest in-plane refractive index in a plane of the compensation film (hereinafter, referred to as a 'fast axis'), $n_z$ is a refractive index in a direction perpendicular to the slow axis and the fast axis of the compensation film, and d is a thickness of the compensation film.

The compensation film may have predetermined in-plane retardation and thickness direction retardation by changing the $n_x$, $n_y$, $n_z$, and/or thickness (d).

The retardation of the compensation film may be the same or different depending on a wavelength.

In an exemplary embodiment, the compensation film may have a forward wavelength dispersion retardation wherein a retardation about light at a short wavelength is larger than a retardation about light at a long wavelength. When a 550 nm wavelength is a reference wavelength, for example, retardations (R) at 450 nm, 550 nm, and 650 nm wavelengths of the compensation film may satisfy Relationship Equation 1 or 2.

$R(450\ nm) \geq R(550\ nm) > R(650\ nm)$  Relationship Equation 1

$R(450\ nm) > R(550\ nm) \geq R(650\ nm)$  Relationship Equation 2

In an exemplary embodiment, the compensation film may have a flat wavelength dispersion retardation wherein a retardation about light at a long wavelength is substantially equivalent to a retardation about light at a short wavelength and retardations (R) at 450 nm, 550 nm, and 650 nm wavelengths of the compensation film may satisfy Relationship Equation 3.

$R(450\ nm)=R(550\ nm)=R(650\ nm)$  Relationship Equation 3

In an exemplary embodiment, the compensation film may have a reverse wavelength dispersion retardation wherein a retardation about light at a long wavelength is larger than a retardation about light at a short wavelength and for example retardations (R) at 450 nm, 550 nm, and 650 nm wavelengths of the compensation film may satisfy Relationship Equation 4 or 5.

$R(450\ nm) \leq R(550\ nm) < R(650\ nm)$  Relationship Equation 4

$R(450\ nm) < R(550\ nm) \leq R(650\ nm)$  Relationship Equation 5

In Relationship Equations 1 to 5,

R(450 nm) is an in-plane retardation or a thickness direction retardation of the compensation film at a 450 nm wavelength, R(550 nm) is an in-plane retardation or a thickness direction retardation of the compensation film at a 550 nm wavelength, and R(650 nm) is an in-plane retardation or a thickness direction retardation of the compensation film at a 650 nm wavelength.

The compensation film may be adjusted to have a desired retardation depending on a wavelength.

The compensation film may have high birefringence, and thus, a relatively thin thickness. The compensation film may have, for example, a thickness of about 3 μm to about 200 μm, within the range, a thickness of about 5 μm to about 150 μm, and within the range, a thickness of about 5 μm to about 100 μm.

The compensation film includes a substantially transparent polymer, and thus, may be used as a substrate, and accordingly, a separate substrate beneath the compensation film may be omitted. Accordingly, a thickness of the compensation film may be further reduced. Accordingly, the compensation film may be effectively applied to a flexible display device such as a foldable display device or a bendable display device, and thus, improve optical properties and display characteristics.

The compensation film may be formed, for example, through preparation of the monomer according to an embodiment, polymerization of the monomer into a polymer, formation of the polymer into a polymer film, and elongation of the polymer film.

The polymer film may be elongated, for example, at an elongation rate of about 110% to about 1,000%, at about 50°

C. to about 500° C. Herein, the elongation rate indicates a length ratio after and before the elongation, that is, a degree of length increase of the polymer film after elongation in a uniaxial direction. In an exemplary embodiment, the polymer film may be elongated in a uniaxial direction.

The compensation film may be used alone or along with other compensation films.

The compensation film may be used with a polarizer and may be used as an optical film to prevent reflection of external light of a display device. The optical film may be for example an anti-reflective film, but is not limited thereto.

Figure 2:
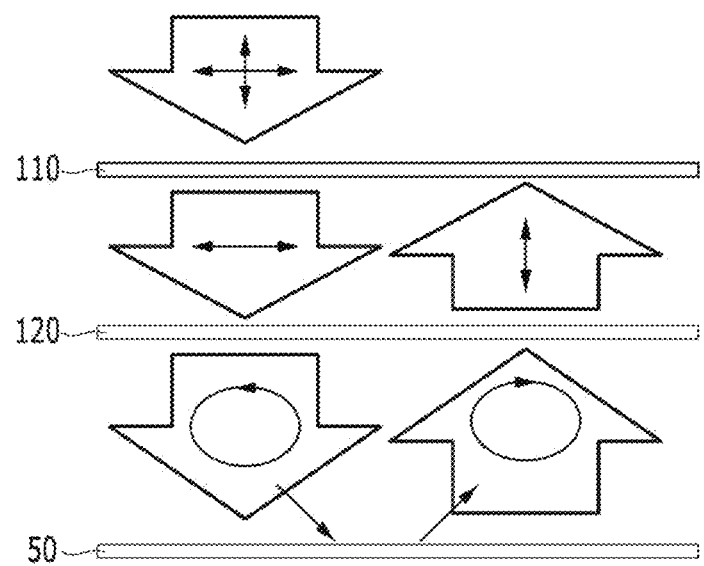
FIG. 2 is a schematic view showing an exemplary embodiment of the external light anti-reflection principle of an optical film.
Figure 3:
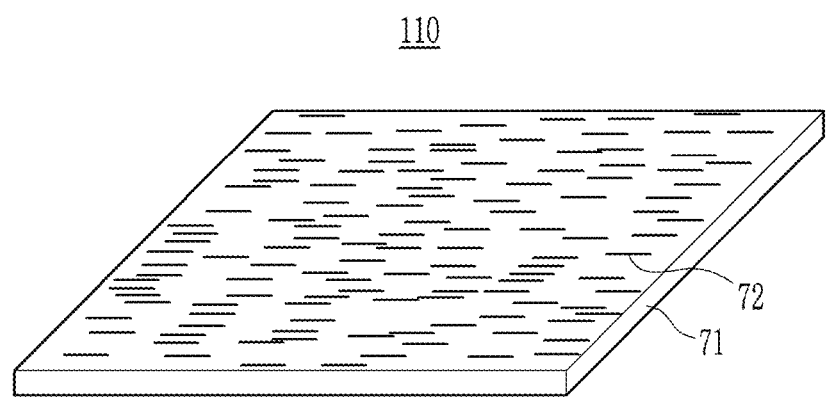
FIG. 3 is a schematic view showing an exemplary embodiment of a polarizing film.

FIG. 1 is a schematic cross-sectional view of an optical film according to an exemplary embodiment, FIG. 2 is a schematic view showing the external light anti-reflection principle of an exemplary embodiment of an optical film, and FIG. 3 is a schematic view showing an exemplary embodiment of a polarizing film.

Referring to FIG. 1, an optical film 100 according to an embodiment includes a polarizer 110 and a compensation film 120. The compensation film 120 may circularly polarize light passing the polarizer 110 to generate retardation and may have an effect on reflection and/or absorption of light.

In an exemplary embodiment, the optical film 100 may be formed on one surface or both surfaces of a display device and particularly on the screen side of the display device, and thus, may prevent reflection of light inflowing from the outside (hereinafter referred to as "external light"). Accordingly, visibility deterioration due to reflection of external light may be prevented.

FIG. 2 is a schematic view showing the external light anti-reflection principle of an exemplary embodiment of an optical film.

Referring to FIG. 2, while the incident unpolarized light having entered from the outside is passed through the polarizer 110, only a first polarized perpendicular component, which is one polarized perpendicular component of two polarized perpendicular components, is transmitted, and the polarized light is shifted into circularly polarized light by passing through the compensation film 120. While the circularly polarized light is reflected in a display panel 50 including a substrate, an electrode, and so on, and changes to the circular polarization direction, the circularly polarized light is passed through the compensation film 120 again, only a second polarized perpendicular component, which is the other polarized perpendicular component of the two polarized perpendicular components, may be transmitted. As the second polarized perpendicular component is not passed through the polarizer 110, and light does not exit to the outside, effects of preventing the external light reflection may be provided.

The polarizer 110 may be for example a polarizing plate or a polarizing film.

Referring to FIG. 3, the polarizer 110 may be a polarizing film having an integral structure that is made of for example a melt blend of a polymer resin 71 and a dichroic dye 72.

The polymer resin 71 may be for example a hydrophobic polymer resin, for example polyolefin such as polyethylene (PE), polypropylene (PP), or a copolymer thereof; a polyamide such as nylon or aromatic polyamide; a polyester such as polyethylene terephthalate (PET), polyethylene terephthalate glycol (PETG), or polyethylene naphthalate (PEN); a polyacryl, such as a polymethyl (meth)acrylate, a polystyrene (PS) such as an acrylonitrile-styrene copolymer; a polycarbonate; a vinyl chloride-based resin; a polyimide; a sulfone resin; a polyethersulfone; a polyether-etherketone; a polyphenylene sulfide; a polyvinyl alcohol resin; a vinylidene chloride resin; a polyvinyl butyral resin; an allylate resin; a polyoxymethylene; an epoxy resin, or a copolymer thereof, or a combination thereof.

In an exemplary embodiment, the polymer resin 71 may be for example a polyolefin resin, a polyamide resin, a polyester resin, a polyacrylic resin, a polystyrene resin, a copolymer thereof, or a combination thereof, for example a polyethylene (PE), a polypropylene (PP), a polyethylene terephthalate (PET), a glycol-modified polyethylene terephthalate (PETG), a polyethylene naphthalate (PEN), aliphatic polyamide, a copolymer thereof, or a combination thereof.

In an exemplary embodiment, the polymer resin 71 may be polyolefin. The polyolefin may be for example a mixture of at least two selected from polyethylene (PE), polypropylene (PP), a copolymer of polyethylene and polypropylene (PE-PP), or may be for example a mixture of polypropylene (PP) and a polyethylene-polypropylene copolymer (PE-PP).

The polymer resin 71 may have transmittance of greater than or equal to about 85% in a wavelength region of about 400 nm to about 780 nm. The polymer resin 71 may be elongated in a uniaxial direction. The uniaxial direction may be the same as a length direction of the dichroic dye 72 that will be described later.

The dichroic dye 72 may be dispersed in the polymer resin 71 and aligned in one direction along the elongation direction of the polymer resin 71. The dichroic dye 72 transmits one perpendicular polarization component out of two perpendicular polarization components in a predetermined wavelength region.

The dichroic dye 72 may be included in an amount of about 0.01 to about 5 parts by weight based on 100 parts by weight of the polymer resin 71. Within the range, sufficient polarization characteristics may be obtained without deteriorating transmittance of a polarization film. Within the above range, the dichroic dye 72 may be included in an amount of about 0.05 to about 1 part by weight based on 100 parts by weight of the polymer resin 71.

The polarizer 110 may have a relatively thin thickness of less than or equal to about 100 µm, for example, about 30 µm to about 95 µm. When the polarizing film 70 has a thickness within that range, the polarizer 110 is relatively thinner than a polyvinyl alcohol polarizing plate requiring a protective layer such as triacetyl cellulose (TAC), and thus, may realize a thin display device.

The compensation film 120 is the same as described above.

The optical film 100 may further include a correction layer (not shown) disposed on one surface of the compensation film 120. The correction layer may be for example a color shift resistant layer, but is not limited thereto.

The optical film 100 may further include a light blocking layer (not shown) extended along the edge. The light blocking layer may be extended along the circumference of the optical film 100 and may be for example disposed between the polarizer 110 and the compensation film 120. The light blocking layer may include an opaque material, for example, a black material. In an exemplary embodiment, the light blocking layer may be made of a black ink.

The optical film 100 may be applied to various display devices.

A display device according to an embodiment may include a display panel and an optical film disposed on one surface of the display panel. The display panel may be a liquid crystal panel or an organic light emitting panel, but is not limited thereto.

Hereinafter, for an exemplary embodiment of the display device, an organic light emitting diode (OLED) display is described.

Figure 4:
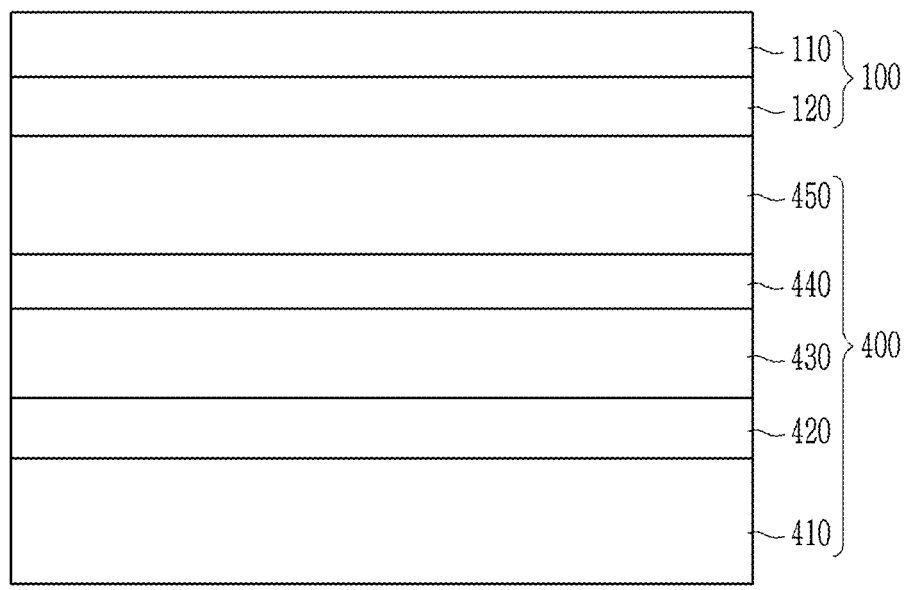
FIG. 4 is a schematic cross-sectional view of an exemplary embodiment of an organic light emitting diode (OLED) display.

FIG. 4 is a schematic cross-sectional view of an exemplary embodiment of an organic light emitting diode (OLED) display.

Referring to FIG. 4, an organic light emitting diode (OLED) display according to an embodiment may include an organic light emitting panel 400 and an optical film 100 disposed on one surface of the organic light emitting panel 400.

The organic light emitting panel 400 may include a base substrate 410, a lower electrode 420, an organic emission layer 430, an upper electrode 440, and an encapsulation substrate 450.

The base substrate 410 may be glass or polymeric.

One of the lower electrode 420 and the upper electrode 440 may be an anode and the other may be a cathode. The anode may be an electrode into which holes are injected and may be made of a transparent conductive material having a high work function and passing the emitted light to outside, for example ITO or IZO. The cathode is an electrode into which electrons are injected and may be made of a conducting material having a low work function and having no effect on an organic material, for example Aluminum (Al), Calcium (Ca), or Barium (Ba).

The organic emission layer 430 may include an organic material which may emit light when applying a voltage to the lower electrode 420 and the upper electrode 440.

An auxiliary layer (not shown) may be further provided between the lower electrode 420 and the organic emission layer 430 and between the upper electrode 440 and the organic emission layer 430. The auxiliary layer may include a hole transporting layer, a hole injecting layer, an electron injecting layer, and an electron transporting layer in order to balance electrons and holes.

The encapsulation substrate 450 may be made of glass, a metal, or a polymer, and may seal the lower electrode 420, the organic emission layer 430, and the upper electrode 440 to prevent moisture and/or oxygen inflow from the outside.

The optical film 100 may be disposed at a light emitting side. In an exemplary embodiment, in the case of a bottom emission structure emitting light at the side of the base substrate 410, the optical film 100 may be disposed on the exterior side of the base substrate 710, while on the other hand, in the case of a top emission structure emitting light at the side of the encapsulation substrate 450, the optical film 100 may be disposed on the exterior side of the encapsulation substrate 450.

The optical film 100 may include the integral structured polarizer 110 and the integrally structured compensation film 120. The polarizer 110 and the compensation film 120 are the same as described above and may prevent light passing the polarizer 110 from being reflected by a metal such as an electrode of the organic light emitting panel 400 and emitting outside of the organic light emitting display device, and thus, prevents visibility from being deteriorated by externally inflow light. Therefore, display characteristics of the organic light emitting diode (OLED) display may be improved.

Hereinafter, for an exemplary embodiment of the display device, a liquid crystal display (LCD) is described.

Figure 5:
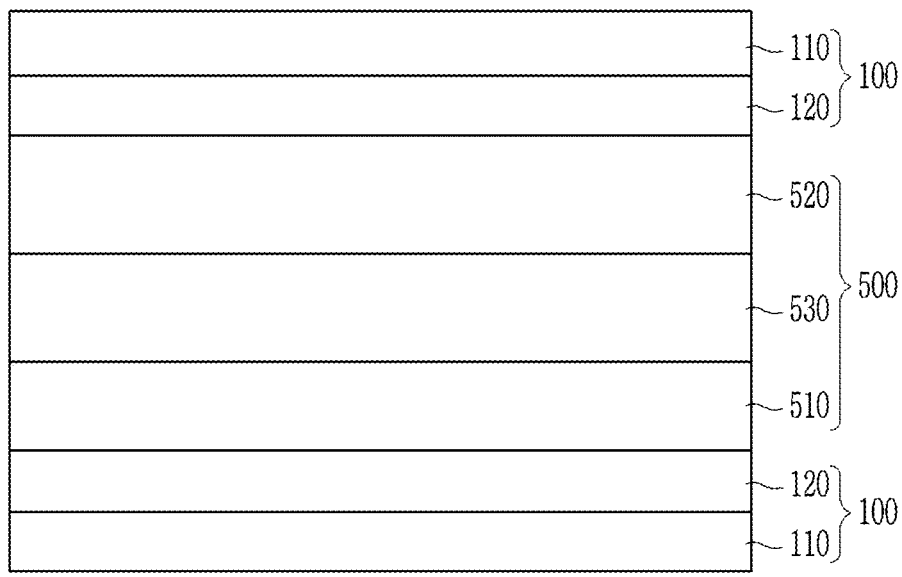
FIG. 5 is a schematic cross-sectional view of an exemplary embodiment of a liquid crystal display (LCD)

FIG. 5 is a schematic cross-sectional view of an exemplary embodiment of a liquid crystal display (LCD).

Referring to FIG. 5, an exemplary embodiment of a liquid crystal display (LCD) may include a liquid crystal panel 500 and an optical film 100 positioned on one surface or both surfaces of the liquid crystal panel 500.

The liquid crystal panel 500 may be a twist nematic (TN) mode panel, a vertical alignment (PVA) mode panel, an in-plane switching (IPS) mode panel, an optically compensated bend (OCB) mode panel, or the like.

The liquid crystal panel 500 may include a first display panel 510, a second display panel 520, and a liquid crystal layer 530 interposed between the first display panel 510 and the second display panel 520.

The first display panel 510 may include, for example, a thin film transistor (not shown) formed on a substrate (not shown) and a first electric field generating electrode (not shown) connected to the same, and the second display panel 520 may include, for example, a color filter (not shown) formed on a substrate (not shown) and a second electric field generating electrode (not shown). However, it is not limited thereto, and the color filter may be included in the first display panel 510, while the first electric field generating electrode and the second electric field generating electrode may be disposed on the first display panel 510 together.

The liquid crystal layer 530 may include a plurality of liquid crystal molecules. The liquid crystal molecules may have positive or negative dielectric anisotropy. In the case of the liquid crystal molecules having positive dielectric anisotropy, the major axes thereof may be aligned substantially parallel to the surface of the first display panel 510 and the second display panel 520 when not applying an electric field, and the major axes may be aligned substantially perpendicular to the surface of the first display panel 510 and second display panel 520 when applying an electric field. On the other hand, in the case of the liquid crystal molecules having negative dielectric anisotropy, the major axes may be aligned substantially perpendicular to the surface of the first display panel 510 and the second display panel 520 when not applying an electric field, and the major axes may be aligned substantially parallel to the surface of the first display panel 510 and the second display panel 520 when applying an electric field.

The optical film 100 may be disposed on the outside of the liquid crystal panel 500. Although the optical film 100 is shown to be provided on both the lower part and the upper part of the liquid crystal panel 500 in the drawing, it is not limited thereto, and it may be formed on only one of the lower part and the upper part of the liquid crystal panel 500.

Hereinafter, the present disclosure is illustrated in more detail with reference to examples. However, these examples are exemplary, and the present disclosure is not limited thereto.

EXAMPLES

Synthesis Example 1

Synthesis of Compound M-1

Compound M-1 is prepared according to Reaction Scheme M-1, and a method of preparing Intermediate I-1 and Compound M-1 as a final product is classified into Steps 1 and 2 and illustrated in detail:

Reaction Scheme M-1

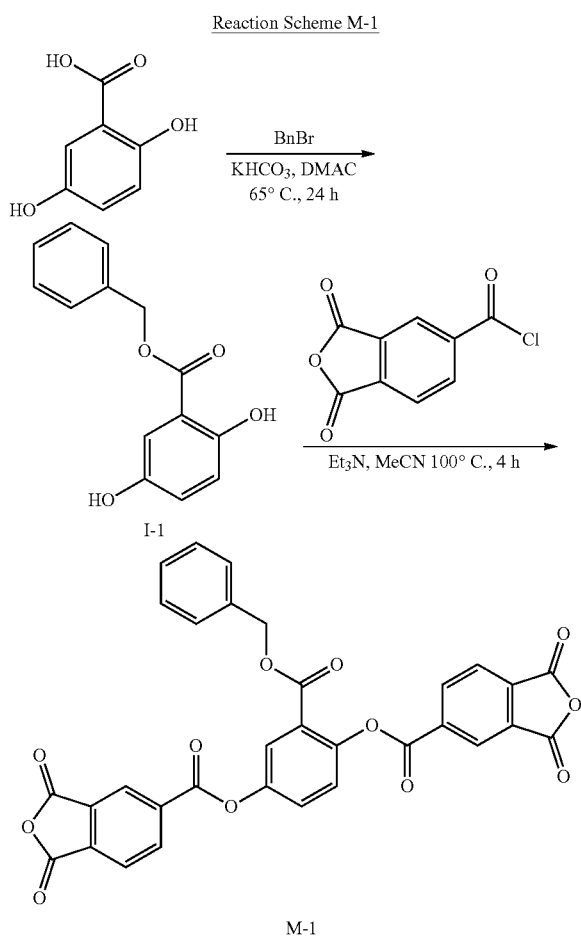

Step 1: Synthesis of Intermediate I-1 (2,5-dihydroxybenzoic acid benzyl ester)

2,5-dihydroxybenzoic acid (m=77.06 grams (gr), 0.5 moles (mol), mw=154.13 grams per mole (g/mol)), benzylbromide (m=85.52 gr, 0.5 mol, mw=171.04 g/mol), and potassium hydrogen carbonate (m=100.12 gr, 1 mol, mw=100.12 g/mol) are added to 0.5 liters (L) of dimethyl acetamide (DMAc), and the mixture is stirred under a nitrogen atmosphere at 65° C. for 24 hours. When the reaction is complete, the mixture is poured into 3 L of water, and the obtained mixture is stirred. The reactant is oily during the initial reaction but gradually becomes solid. Subsequently, the solid is filtered, washed, and dried at 80° C. to obtain Intermediate I-1 (m=119.7 gr, 0.49 mol, mw=244.25 g/mol) in an off-white powder state (yield: 98.0%).

$R_f$=0.60 (Eluent: ethyl acetate:hexane=1:2, TLC silica gel 60 $F_{254}$);

$^1$H NMR (DMSO-$d_6$) 300 MHz, δ, ppm: 5.37 (s, 2H), 6.83 (d, 1H, $J^{12}$=9 Hz), 6.99 (dd, 1H, $J^{12}$=9 Hz, $J^{13}$=3.0 Hz), 7.19 (d, 1H, $J^{13}$=3.0 Hz), 7.35-7.50 (m, 5H), 9.25 (br s, 1H, OH), 9.89 (br s, 1H, OH).

Step 2: Synthesis of Monomer M-1 (bis-trimellitic acid anhydride ester of benzyl-2,5-dihydroxy-benzoate)

Trimellitic anhydride chloride (m=115.8 gr, 0.55 mol, mw=210.57 g/mol) is added to 1.5 L of acetonitrile and dissolved therein at 100° C., and Intermediate I-1 (m=61.06 gr, 0.25 mol, mw=244.2 g/mol) is added to the solution. Then, another solution obtained by dissolving triethylamine (m=55.65 gr, 0.55 mol, mw=101.19 g/mol) in 200 milliliters (mL) of acetonitrile is added to the reaction mixture in a dropwise fashion at 100° C., and the obtained mixture is vigorously stirred for 30 minutes. Subsequently, the resulting material is refluxed for 4 hours and filtered in a hot state to remove an insoluble material, and the filtered solution is cooled down to room temperature to obtain a white crystalline precipitate. The precipitate is filtered and washed with a small amount of acetonitrile, and a white solid obtained therefrom is twice recrystallized with 1.5 L of acetonitrile, while acetic anhydride (m=102.09 gr, 1 mol, mw=102.09 g/mol) is added thereto. The crystallized solid is washed with a small amount of acetonitrile, dried at 90° C. under vacuum for 24 hours to obtain Monomer M-1 (m=118.5 gr, 0.2 mmol, mw=592.48 g/mol) as a white crystalline solid (yield: 80%). $^1$H NMR (DMSO-$d_6$) 300 MHz, δ, ppm: 5.21 (s, 2H), 7.20-7.30 (m, 5H), 7.67 (d, 1H, $J^{12}$=8.7 Hz), 7.85 (dd, 1H, $J^{12}$=8.7 Hz, $J^{13}$=2.7 Hz), 8.14 (d, 1H, $J^{13}$=2.7 Hz), 8.24 (dd, 1H, $J^{12}$=8.1 Hz, $J^{14}$=0.6 Hz), 8.30 (d, 1H, $J^{12}$=8.1 Hz), 8.46-8.47 (m, 1H), 8.55 (dd, 1H, $J^{12}$=8.1 Hz, $J^{13}$=1.5 Hz), 8.65-8.68 (m, 2H);

HRMS APCI (m/z) for $C_{32}H_{16}O_{12}$: 592.0607 (measured mass), 592.0643 (calculated mass) for [M+H]$^+$;

Thermal analysis: TGA (heating: 10 degrees Centigrade per minute (° C./min), $N_2$ atmosphere): 1 percent by weight (wt %) loss (268° C.); and DSC (heating: 10° C./min, $N_2$ atmosphere): mp=105.1° C. (CrN), 195.5° C. (NI).

Synthesis Example 2

Synthesis of Compound M-18

Compound M-18 is prepared according to Reaction Scheme M-18, and a method of preparing Intermediate I-18 and Compound M-18 as a final product is respectively classified into Steps 1 and 2 and illustrated in detail as follows:

Reaction Scheme M-18

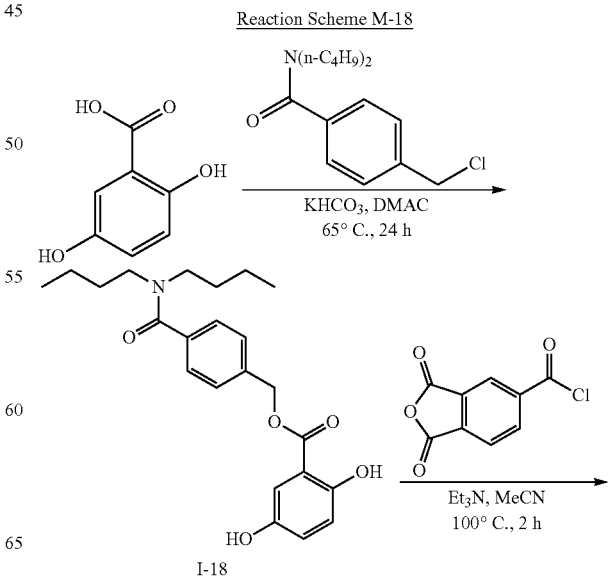

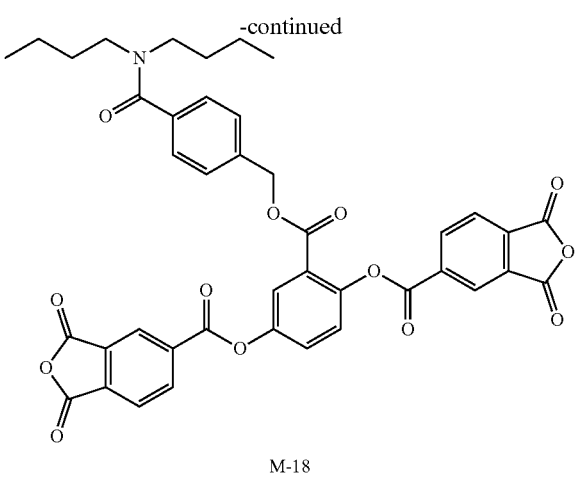

M-18

Step 1: Synthesis of Intermediate I-18 (2,5-dihydroxybenzoic acid 4-N,N-dibutylcarbamoylbenzyl ester)

Intermediate I-18 is synthesized in a similar method to that of Intermediate I-1 by adding 2,5-dihydroxybenzoic acid (mw=154.12 g/mol, 99.35 mmol, m=15.31 gr), N,N-di-n-butyl-4-chloromethyl benzamide (mw=281.83 g/mol, 99.35 mol, m=33.17 gr), and potassium hydrogen carbonate (mw=100.12 g/mol, 200 mmol, m=20.02 gr) to 0.2 L of dimethyl acetamide (DMAc), and reacting under a nitrogen atmosphere at 65° C. for 24 hours. When the reaction is complete, the mixture is poured into 1.5 L of water, the white sticky solid precipitate is filtered, washed with water, dried, and crystallized from about 400 mL of hexane/dichloromethane. The white crystalline material obtained therefrom is filtered, washed with hexane, and dried at 80° C. under a reduced pressure for 24 hours. The final product therefrom is a white crystalline solid. $R_f$=0.23 (Eluent: ethyl acetate:hexane=1:2, TLC silica gel 60 $F_{254}$), m=31.4 gr (mw=399.49 g/mol, 78.60 mmol), yield: 79.1%, mp=117-119° C.

$^1$H NMR (DMSO-$d_6$) 300 MHz, δ, ppm: 0.65-0.75 (m, 3H), 0.88-0.98 (m, 3H), 1.00-1.12 (m, 2H), 1.27-1.37 (m, 2H), 1.39-1.49 (m, 2H), 1.51-1.61 (m, 2H), 3.09-3.19 (m, 2H), 3.35-3.45 (m, 2H), 5.40 (s, 2H), 6.83 (d, 1H, $J^{12}$=9.0 Hz), 6.98 (dd, 1H, $J^{12}$=9.0 Hz, $J^{13}$=3.0 Hz), 7.19 (d, 1H, $J^{13}$=3.0 Hz), 7.36 (d, 2H, $J^{12}$=8.4 Hz), 7.53 (d, 2H, $J^{12}$=8.4 Hz), 9.24 (br s, 1H), 9.89 (br s, 1H).

Step 2: Synthesis of Monomer M-18 (bis-trimellitic acid anhydride ester of 2,5-dihydroxybenzoic acid 4-N,N-di-n-butylcarbamoylbenzyl ester)

Monomer M-18 is prepared in a similar method to that of Monomer M-1 by adding trimellitic anhydride chloride (mw=210.57 g/mol, 164.13 mmol, m=34.56 gr), Intermediate I-18 (2,5-dihydroxybenzoic acid 4-N,N-di-n-butylcarbamoylbenzyl ester, mw=399.49 g/mol, 78.15 mmol, m=31.22 gr), and triethylamine (mw=101.19 g/mol, 168 mmol, m=17 gr) to 1 L of acetonitrile. When the reaction is complete, the obtained brown solution is filtered in a hot state to remove an insoluble material and then, the filtrate is concentrated down to 0.4 L of a volume. From the hot solution, a white solid is almost immediately precipitated. The solid is filtered and washed with a small amount of acetonitrile. A crude product therefrom is twice recrystallized from a mixture of acetonitrile (500 mL) and acetic anhydride (30 mL) and dried under vacuum at 85° C. for 24 hours to obtain Monomer M-18 as a white crystalline solid. m=35.09 gr (mw=747.72 g/mol, 46.93 mmol), yield: 60.5%.

$^1$H NMR (DMSO-$d_6$) 300 MHz, δ, ppm: 0.62-0.72 (m, 3H), 0.90-1.08 (m, 5H), 1.25-1.60 (m, 6H), 3.00-3.10 (m, 2H), 3.35-3.45 (m, 2H), 5.24 (s, 2H), 7.11 (d, 2H, $J^{12}$=8.1 Hz), 7.32 (d, 2H, $J^{12}$=8.1 Hz), 7.65 (d, 1H, $J^{12}$=8.7 Hz), 7.85 (dd, 1H, $J^{12}$=9.0 Hz, $J^{13}$=3.0 Hz), 8.15 (d, 1H, $J^{13}$=3.0 Hz), 8.19 (d, 1H, $J^{12}$=7.8 Hz), 8.29 (d, 1H, $J^{12}$=8.4 Hz), 8.40 (br s, 1H), 8.49 (dd, 1H, $J^{12}$=7.8 Hz, $J^{13}$=1.5 Hz), 8.65-8.68 (m, 2H).

Thermal analysis: TGA (heating 10° C./min, N$_2$ atmosphere): 1 wt % loss (332.8° C.); DSC (heating 10° C./min, N$_2$ atmosphere): mp=180.0° C.

Examples 1 to 10 and Comparative Examples 1 to 3

Synthesis of Poly(ester-imide)

Example 1

40 milliliters (ml) of N,N-dimethyl acetamide (DMAc) as a solvent is charged into a 4-neck double-walled 250 mL reactor, pre-heated to 25° C., and equipped with a mechanical stirrer and a nitrogen inlet, and 4.6113 g (0.0144 mol) of 2,2'-bis(trifluoromethyl)benzidine (TFDB) is added thereto to dissolve. Then, 7.5837 g (0.0128 mol) of Compound M-1 (bis-trimellitic acid anhydride ester of benzyl-2,5-dihydroxy-benzoate) prepared in Synthesis Example 1, 1.4216 g (0.0032 mol) of 4,4'-(hexafluoroisopropylidene) diphthalic anhydride (6FDA), and 26 ml of DMAc are added thereto, and reacted therewith for 24 hours at 25° C. to prepare a poly(ester-amic acid) solution, of which the solid content is 15 weight %. Then, 0.476 ml (0.00288 mol) of octylamine (OA) is added to the poly(ester-amic acid) solution, as an end-capper, and the mixture is stirred for 2 hours at 25° C. to obtain a poly(ester-amic acid) solution, wherein the two ends of the polymer are capped with octylamine. To the poly(ester-amic acid) solution, 3.9 ml (0.0418 mol) of acetic anhydride and 3.4 ml (0.0418 mol) of pyridine are slowly added, and stirred for 15 hours at 25° C. to complete chemical imidization of the poly(ester-amic acid). After precipitating the obtained poly(ester-imide) in distilled water, it is washed with ethanol. After filtering, a white solid is obtained, and is dried at 80° C., overnight, under vacuum. 1.8 gram of poly(ester-imide) is dissolved in 8.2 gram of DMAc to prepare a solution of solid content of 18 weight %.

Figure 6:
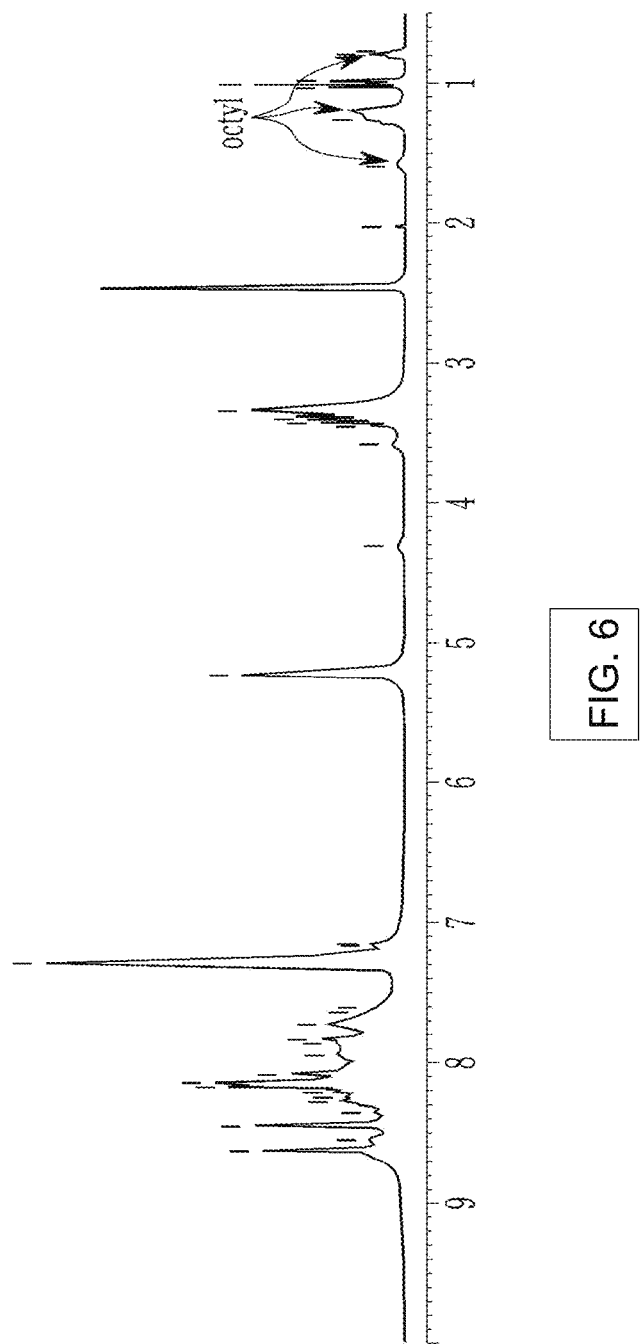
FIG. 6 is a $H^1$-NMR spectrum of an exemplary embodiment of a poly(ester-imide), of which the ends are capped with octylamine, according to Example 1.

As shown in FIG. 6, the structure of the obtained poly(ester-imide) capped with octylamine is confirmed by H$^1$-NMR spectroscopy (Bruker AVANCE DPX 300 spectrometer (300 MHz)). The chemical shifts at 0.85 ppm, 1.25 ppm, and 1.64 ppm are derived from the aliphatic protons of octylamine.

The viscosity and inherent viscosity ($\eta_{inh}$) of the polymer solution, as well as number average molecular weight, weight average molecular weight, and polydispersity index (PDI) of the polymer are determined as below and described in Table 1:

(1) Viscosity of polymer in DMAc having a solid content of 10 weight % is determined by using a cone and a plate having a cone diameter of 40 nm and a cone angle of 2° with AR 2000 rheometer.

(2) Inherent viscosity ($\eta_{inh}$) of a polymer solution in DMAc in a concentration of 0.5 g/dl is determined by using Cannon Polyvis AutomatedViscosimeter.

(3) Each of the number average molecular weight (Mn), weight average molecular weight (Mw), and PDI of a polymer is determined by using DMF as a solvent in accordance with the polystyrene standardization with Acquity APC Chromatograph (Waters) at a flow rate of 0.5 ml/min.

Example 2

30 milliliters (ml) of N,N-dimethyl acetamide (DMAc) as a solvent is charged into a 4-neck double-walled 250 mL reactor, pre-heated to 25° C., and equipped with a mechanical stirrer and a nitrogen inlet, and 2.8821 g (0.009 mol) of 2,2'-bis(trifluoromethyl)benzidine (TFDB) is added thereto to dissolve. Then, 4.7398 g (0.008 mol) of Compound M-1 (bis-trimellitic acid anhydride ester of benzyl-2,5-dihydroxy-benzoate) prepared in Synthesis Example 1, 0.8885 g (0.002 mol) of 4,4'-(hexafluoroisopropylidene) diphthalic anhydride (6FDA), and 13 ml of DMAc are added thereto, and reacted therewith for 24 hours at 25° C. to prepare a poly(ester-amic acid) solution, of which the solid content is 18 weight %. Then, 0.316 ml (0.002 mol) of 4-phenylbutyl amine (PBA) is added to the poly(ester-amic acid) solution, as an end-capper, and the mixture is stirred for 2 hours at 25° C. to obtain a poly(ester-amic acid) solution, wherein the two ends of the polymer are capped with 4-phenylbutyl amine. To the poly(ester-amic acid) solution, 2.8 ml (0.03 mol) of acetic anhydride and 2.4 ml (0.03 mol) of pyridine are slowly added, and stirred for 15 hours at 25° C. to complete chemical imidization of the poly(ester-amic acid). After precipitating the obtained poly(ester-imide) in a distilled water, it is washed with ethanol. After filtering, a white solid is obtained, and is dried at 80° C., overnight, under vacuum. 1.8 gram of poly(ester-imide) is dissolved in 8.2 gram of DMAc to prepare a solution of solid content of 18 weight %.

The viscosity, and inherent viscosity ($\eta_{inh}$) of the polymer solution, as well as number average molecular weight, weight average molecular weight, and polydispersity index (PDI) of the polymer are determined by using the same method as in Example 1 and are described in Table 1.

Example 3

A poly(ester-imide) is prepared by using the same method as in Example 2, except for the difference that 0.150 ml (0.002 mol) of allylamine (AA) is used as an end-capper instead of 4-phenylbutyl amine, and the viscosity, and inherent viscosity ($\eta_{inh}$) of the polymer solution, as well as number average molecular weight, weight average molecular weight, and polydispersity index (PDI) of the polymer are determined by using the same method as in Example 1 and are described in Table 1.

Example 4

A poly(ester-imide) is prepared by using the same method as in Example 2, except for the difference that 0.198 ml (0.002 mol) of butylamine (BA) is used as an end-capper instead of 4-phenylbutyl amine, and the viscosity, and inherent viscosity ($\eta_{inh}$) of the polymer solution, as well as number average molecular weight, weight average molecular weight, and polydispersity index (PDI) of the polymer are determined by using the same method as in Example 1 and are described in Table 1.

Example 5

A poly(ester-imide) is prepared by using the same method as in Example 2, except for the difference that 0.539 g (0.002 mol) of hexadecylamine (HDA) is used as an end-capper instead of 4-phenylbutyl amine, and the viscosity, and inherent viscosity ($\eta_{inh}$) of the polymer solution, as well as number average molecular weight, weight average molecular weight, and polydispersity index (PDI) of the polymer are determined by using the same method as in Example 1 and are described in Table 1.

Example 6

A poly(ester-imide) is prepared by using the same method as in Example 2, except for the difference that 0.3707 g (0.002 mol) of dodecylamine (DDA) is used as an end-capper instead of 4-phenylbutyl amine, and the viscosity, and inherent viscosity ($\eta_{inh}$) of the polymer solution, as well as number average molecular weight, weight average molecular weight, and polydispersity index (PDI) of the polymer are determined by using the same method as in Example 1 and are described in Table 1.

Example 7

30 milliliters (ml) of N,N-dimethyl acetamide (DMAc) as a solvent is charged into a 4-neck double-walled 250 mL reactor, pre-heated to 25° C., and equipped with a mechanical stirrer and a nitrogen inlet, and 2.786 g (0.0087 mol) of 2,2'-bis(trifluoromethyl)benzidine (TFDB) is added thereto to dissolve. Then, 4.7398 g (0.008 mol) of Compound M-1 (bis-trimellitic acid anhydride ester of benzyl-2,5-dihydroxy-benzoate) prepared in Synthesis Example 1, 0.8885 g (0.002 mol) of 4,4'-(hexafluoroisopropylidene) diphthalic anhydride (6FDA), and 12.5 ml of DMAc are added thereto, and reacted therewith for 24 hours at 25° C. to prepare a poly(ester-amic acid) solution, of which the solid content is 18 weight %. Then, 0.430 ml (0.0026 mol) of octylamine (OA) is added to the poly(ester-amic acid) solution, as an end-capper, and the mixture is stirred for 2 hours at 25° C. to obtain a poly(ester-amic acid) solution, wherein the two ends of the polymer are capped with octylamine. To the poly(ester-amic acid) solution, 2.8 ml (0.03 mol) of acetic anhydride and 2.4 ml (0.03 mol) of pyridine are slowly added, and stirred for 15 hours at 25° C. to complete chemical imidization of the poly(ester-amic acid). After precipitating the obtained poly(ester-imide) in a distilled water, it is washed with ethanol. After filtering, a white solid is obtained, and is dried at 80° C., overnight, under vacuum. 1.8 gram of poly(ester-imide) is dissolved in 8.2 gram of DMAc to prepare a solution of solid content of 18 weight %.

The viscosity of, and inherent viscosity ($\eta_{inh}$) the polymer solution, as well as number average molecular weight, weight average molecular weight, and polydispersity index (PDI) of the polymer are determined by using the same method as in Example 1 and are described in Table 1.

Example 8

A poly(ester-imide) is prepared by using the same method as in Example 7, except for the difference that 0.33 ml (0.002 mol) of octylamine (OA) is used as an end-capper, and the viscosity, and inherent viscosity ($\eta_{inh}$) of the polymer solution, as well as number average molecular weight, weight average molecular weight, and polydispersity index (PDI) of the polymer are determined by using the same method as in Example 1 and are described in Table 1.

Example 9

30 milliliters (ml) of N,N-dimethyl acetamide (DMAc) as a solvent is charged into a 4-neck double-walled 250 mL reactor, pre-heated to 25° C., and equipped with a mechanical stirrer and a nitrogen inlet, and 2.5618 g (0.008 mol) of 2,2'-bis(trifluoromethyl)benzidine (TFDB) is added thereto to dissolve. Then, 4.7398 g (0.008 mol) of Compound M-1 (bis-trimellitic acid anhydride ester of benzyl-2,5-dihydroxy-benzoate) prepared in Synthesis Example 1, 0.8885 g (0.002 mol) of 4,4'-(hexafluoroisopropylidene) diphthalic anhydride (6FDA), and 11 ml of DMAc are added thereto, and reacted therewith for 24 hours at 25° C. to prepare a poly(ester-amic acid) solution, of which the solid content is 18 weight %. Then, 0.330 ml (0.002 mol) of octylamine (OA) is added to the poly(ester-amic acid) solution, as an end-capper, and the mixture is stirred for 2 hours at 25° C. to obtain a poly(ester-amic acid) solution, wherein the two ends of the polymer are capped with octylamine. To the poly(ester-amic acid) solution, 2.8 ml (0.03 mol) of acetic anhydride and 2.4 ml (0.03 mol) of pyridine are slowly added, and stirred for 15 hours at 25° C. to complete chemical imidization of the poly(ester-amic acid). After precipitating the obtained poly(ester-imide) in a distilled water, it is washed with ethanol. After filtering, white solid is obtained, and is dried at 80° C., overnight, under vacuum. 1.8 gram of poly(ester-imide) is dissolved in 8.2 gram of DMAc to prepare a solution of solid content of 18 weight %.

The viscosity, and inherent viscosity ($\eta_{inh}$) of the polymer solution, as well as number average molecular weight, weight average molecular weight, and polydispersity index (PDI) of the polymer are determined by using the same method as in Example 1 and are described in Table 1.

Example 10

30 milliliters (ml) of N,N-dimethyl acetamide (DMAc) as a solvent is charged into a 4-neck double-walled 250 mL reactor, pre-heated to 25° C., and equipped with a mechanical stirrer and a nitrogen inlet, and 2.786 g (0.0087 mol) of 2,2'-bis(trifluoromethyl)benzidine (TFDB) is added thereto to dissolve. Then, 5.9817 g (0.008 mol) of Compound M-18 (Bis-trimellitic acid anhydride ester of 2,5-dihydroxybenzoic acid 4-N,N-di-n-butylcarbamoylbenzyl ester) prepared in Synthesis Example 2, 0.8885 g (0.002 mol) of 4,4'-(hexafluoroisopropylidene) diphthalic anhydride (6FDA), and 17 ml of DMAc are added thereto, and reacted therewith for 24 hours at 25° C. to prepare a poly(ester-amic acid) solution, of which the solid content is 18 weight %. Then, 0.430 ml (0.0026 mol) of octylamine (OA) is added to the poly(ester-amic acid) solution, as an end-capper, and the mixture is stirred for 2 hours at 25° C. to obtain a poly (ester-amic acid) solution, wherein the two ends of the polymer are capped with octylamine. To the poly(ester-amic acid) solution, 2.8 ml (0.03 mol) of acetic anhydride and 2.4 ml (0.03 mol) of pyridine are slowly added, and stirred for 15 hours at 25° C. to complete chemical imidization of the poly(ester-amic acid). After precipitating the obtained poly (ester-imide) in a distilled water, it is washed with ethanol. After filtering, white solid is obtained, and is dried at 80° C., overnight, under vacuum. 1.8 gram of poly(ester-imide) is dissolved in 8.2 gram of DMAc to prepare a solution of solid content of 18 weight %.

The viscosity, and inherent viscosity ($\eta_{inh}$) of the polymer solution, as well as number average molecular weight, weight average molecular weight, and polydispersity index (PDI) of the polymer are determined by using the same method as in Example 1 and are described in Table 1.

Comparative Example 1

50 milliliters (ml) of N,N-dimethyl acetamide (DMAc) as a solvent is charged into a 4-neck double-walled 250 mL reactor, pre-heated to 25° C., and equipped with a mechanical stirrer and a nitrogen inlet, and 4.6113 g (0.0144 mol) of 2,2'-bis(trifluoromethyl)benzidine (TFDB) is added thereto to dissolve. Then, 7.5837 g (0.0128 mol) of Compound M-1 (bis-trimellitic acid anhydride ester of benzyl-2,5-dihydroxy-benzoate) prepared in Synthesis Example 1, 1.4216 g (0.0032 mol) of 4,4'-(hexafluoroisopropylidene) diphthalic anhydride (6FDA), and 16 ml of DMAc are added thereto, and reacted therewith for 24 hours at 25° C. to prepare a poly(ester-amic acid) solution, of which the solid content is 18 weight %. To the poly(ester-amic acid) solution, 4 ml (0.0432 mol) of acetic anhydride and 3.5 ml (0.0432 mol) of pyridine are slowly added, and stirred for 15 hours at 25° C. to complete chemical imidization of the poly(ester-amic acid). After precipitating the obtained poly(ester-imide) in a distilled water, it is washed with ethanol. After filtering, white solid is obtained, and is dried at 80° C., overnight, under vacuum. 1.8 gram of poly(ester-imide) is dissolved in 8.2 gram of DMAc to prepare a solution of solid content of 18 weight %.

The viscosity, and inherent viscosity ($\eta_{inh}$) of the polymer solution, as well as number average molecular weight, weight average molecular weight, and polydispersity index (PDI) of the polymer are determined by using the same method as in Example 1 and are described in Table 1.

Comparative Example 2

50 milliliters (ml) of N,N-dimethyl acetamide (DMAc) as a solvent is charged into a 4-neck double-walled 250 mL reactor, pre-heated to 25° C., and equipped with a mechanical stirrer and a nitrogen inlet, and 4.4576 g (0.01392 mol) of 2,2'-bis(trifluoromethyl)benzidine (TFDB) is added thereto to dissolve. Then, 7.5837 g (0.0128 mol) of Compound M-1 (bis-trimellitic acid anhydride ester of benzyl-2,5-dihydroxy-benzoate) prepared in Synthesis Example 1, 1.4216 g (0.0032 mol) of 4,4'-(hexafluoroisopropylidene) diphthalic anhydride (6FDA), and 15.5 ml of DMAc are added thereto, and reacted therewith for 24 hours at 25° C. to prepare a poly(ester-amic acid) solution, of which the solid content is 18 weight %. To the poly(ester-amic acid) solution, 3.9 ml (0.0418 mol) of acetic anhydride and 3.4 ml (0.0418 mol) of pyridine are slowly added, and stirred for 15 hours at 25° C. to complete chemical imidization of the poly(ester-amic acid). After precipitating the obtained poly (ester-imide) in a distilled water, it is washed with ethanol. After filtering, white solid is obtained, and is dried at 80° C., overnight, under vacuum. 1.8 gram of poly(ester-imide) is dissolved in 8.2 gram of DMAc to prepare a solution of solid content of 18 weight %.

The viscosity, and inherent viscosity ($\eta_{inh}$) of the polymer solution, as well as number average molecular weight, weight average molecular weight, and polydispersity index (PDI) of the polymer are determined by using the same method as in Example 1 and are described in Table 1.

Comparative Example 3

30 milliliters (ml) of N,N-dimethyl acetamide (DMAc) as a solvent is charged into a 4-neck double-walled 250 mL reactor, pre-heated to 25° C., and equipped with a mechanical stirrer and a nitrogen inlet, and 2.786 g (0.0087 mol) of 2,2'-bis(trifluoromethyl)benzidine (TFDB) is added thereto to dissolve. Then, 5.9817 g (0.008 mol) of Compound M-18 (Bis-trimellitic acid anhydride ester of 2,5-dihydroxybenzoic acid 4-N,N-di-n-butylcarbamoylbenzyl ester) prepared in Synthesis Example 2, 0.8885 g (0.002 mol) of 4,4'-

(hexafluoroisopropylidene) diphthalic anhydride (6FDA), and 17 ml of DMAc are added thereto, and reacted therewith for 24 hours at 25° C. to prepare a poly(ester-amic acid) solution, of which the solid content is 18 weight %. To the poly(ester-amic acid) solution, 2.5 ml (0.0261 mol) of acetic anhydride and 2.1 ml (0.0261 mol) of pyridine are slowly added, and stirred for 15 hours at 25° C. to complete chemical imidization of the poly(ester-amic acid). After precipitating the obtained poly(ester-imide) in a distilled water, it is washed with ethanol. After filtering, white solid is obtained, and is dried at 80° C., overnight, under vacuum. 1.8 gram of poly(ester-imide) is dissolved in 8.2 gram of DMAc to prepare a solution of solid content of 18 weight %.

The viscosity, and inherent viscosity ($\eta_{inh}$) of the polymer solution, as well as number average molecular weight, weight average molecular weight, and polydispersity index (PDI) of the polymer are determined by using the same method as in Example 1 and are described in Table 1.

of solvent, heated at a speed of 10° C./min from about 25° C. to about 200° C. in a nitrogen atmosphere, and maintained at 200° C. for 1 hour to form a poly(ester-imide) film according to each Examples and Comparative Examples.

The optical properties, such as a total transmittance (Tr@Total), a transmittance (%) at a wavelength of 450 nm, a yellowness index (YI), a haze, an in-plane refractive index ($n_{xy}$), an out-of-plane refractive index ($n_z$), and a birefringence ($\Delta n_{th}$), and thermal properties, such as, a glass transition temperature ($T_g$) and a 5% weight loss temperature ($T_{d5\%}$) of a film are determined and shown in Table 2. A method of measuring the optical and thermal properties of the film is as follows:

(1) Optical characteristics (transmittance, yellowness index, and haze) of the film are measured by using a spectrophotometer, "Konica Minolta CM3600d," in a transmittance opacity/haze mode. The total transmittance

TABLE 1

| | Composition | Ratio, mol part | Diamine/ dianhydride ratio | Mn | Mw | PDI | $\eta_{inh}$, dL/g | Solution viscosity, cP |
|---|---|---|---|---|---|---|---|---|
| Example 1 | M1:6FDA/TFDB:OA | 80:20/90:20 | 0.9 | 10275 | 30646 | 3.0 | 0.58 | 1271 |
| Example 2 | M1:6FDA/TFDB:PBA | 80:20/90:20 | 0.9 | 10424 | 30583 | 2.9 | 0.56 | 1374 |
| Example 3 | M1:6FDA/TFDB:AA | 80:20/90:20 | 0.9 | 9797 | 29880 | 3.0 | 0.59 | 1754 |
| Example 4 | M1:6FDA/TFDB:BA | 80:20/90:20 | 0.9 | 10955 | 32229 | 2.9 | 0.60 | 2275 |
| Example 5 | M1:6FDA/TFDB:HDA | 80:20/90:20 | 0.9 | 10424 | 30640 | 3.0 | 0.62 | 1732 |
| Example 6 | M1:6FDA/TFDB:DDA | 80:20/90:20 | 0.9 | 8964 | 25565 | 2.9 | 0.45 | 790 |
| Example 7 | M1:6FDA/TFDB:OA | 80:20/87:26 | 0.87 | 5814 | 18018 | 3.1 | 0.35 | 300 |
| Example 8 | M1:6FDA/TFDB:OA | 80:20/87:26 | 0.87 | 5896 | 18326 | 3.1 | 0.38 | 445 |
| Example 9 | M1:6FDA/TFDB:OA | 80:20/80:20 | 0.80 | 4219 | 14526 | 3.4 | 0.22 | 100 |
| Example 10 | M18:6FDA/TFDB:OA | 80:20/87:26 | 0.87 | 7093 | 21517 | 3 | 0.34 | 247 |
| Comparative Example 1 | M1:6FDA/TFDB | 80:20/90 | 0.9 | 9124 | 27455 | 3.0 | 0.54 | 1238 |
| Comparative Example 2 | M1:6FDA/TFDB | 80:20/87 | 0.87 | 8512 | 23098 | 2.7 | 0.39 | 427 |
| Comparative Example 3 | M18:6FDA/TFDB | 80:20/87 | 0.87 | 7239 | 19870 | 2.7 | 0.33 | 236 |

As shown in Table 1, the poly(ester-imide) according to Examples 1 to 10 are prepared by using about 0.8 to about 0.95 mole of diamine per 1 mole of dianhydride to form a poly(ester-amic acid) having both ends as anhydrides, followed by reacting a monoamine, as an end-capper, with the poly(ester-amic acid) to have both ends thereof capped with an alkyl-substituted amino group. Further, the prepared polymer may have a predetermined molecular weight and inherent viscosity due to the mole ratio of the diamine and dianhydride in the above range.

Film Preparation and Evaluation

Each polymer solution prepared according to Examples 1 to 10 and Comparative Examples 1 to 3 is spin-coated at 600 revolutions per minute (rpm) to 1,000 rpm on a 5×5 centimeters (cm) glass substrate. The coated sample is dried on a hot plate set at 80° C. for 30 minutes to evaporate excess (Tr@Total) is measured at a wavelength range of 360 nm to 700 nm.

(2) The refractive indices ($n_{xy}$ and $n_z$), and birefringence ($\Delta n_{th}$) of the film is measured at a wavelength of 450 nanometers (nm) by using a prism coupler (Metricon MODEL 2010/M).

(3) The glass transition temperature ($T_g$) is measured with a fixed tension force of 0.05 Newtons (N) at a heating rate of 5° C./min within a temperature range of 50° C. to 400° C. by using a thermal mechanical analyzer (TMA Q400, TA Instruments).

(4) The 5% weight loss temperature ($T_{d5\%}$) of a film is measured according to the thermal gravimetrical analysis (TGA) of a polymer at a heating rate of 10° C./min in a nitrogen atmosphere by using Discovery TGA (TA Instruments) Thermal Gravimetrical Analysis (TGA) of a polymer.

TABLE 2

| | Tr@Total % | $T_{450\,nm}$ % | Y.I. % | Haze % | $n_{xy}$ | $n_z$ | $\Delta n_{th}$ | $T_g$, ° C. | $T_{d5\%}$, ° C. |
|---|---|---|---|---|---|---|---|---|---|
| Example 1 | 89.91 | 89.11 | 0.78 | 0.36 | 1.66854 | 1.59134 | 0.0772 | 190 | 380 |
| Example 2 | 89.99 | 89.33 | 0.62 | 0.19 | 1.66939 | 1.59526 | 0.07413 | 194 | 371 |
| Example 3 | 89.38 | 88.48 | 0.89 | 0.23 | 1.67148 | 1.59416 | 0.07732 | 196 | 377 |
| Example 4 | 89.45 | 88.69 | 0.8 | 0.14 | 1.66665 | 1.59644 | 0.07021 | 195 | 372 |
| Example 5 | 89.84 | 88.97 | 0.86 | 0.29 | 1.66721 | 1.59401 | 0.0732 | 183 | 386 |
| Example 6 | 89.87 | 89 | 0.84 | 0.19 | 1.67204 | 1.5955 | 0.07654 | 189 | 372 |
| Example 7 | 89.64 | 88.56 | 1.05 | 0.38 | 1.67344 | 1.59691 | 0.07653 | 183 | 367 |
| Example 8 | 89.74 | 88.58 | 1.13 | 0.15 | 1.65000 | 1.58025 | 0.06976 | — | 342 |

TABLE 2-continued

| | Tr@Total % | $T_{450\,nm}$ % | Y.I. % | Haze % | $n_{xy}$ | $n_z$ | $\Delta n_{th}$ | $T_g$, °C. | $T_{d5\%}$, °C. |
|---|---|---|---|---|---|---|---|---|---|
| Example 9 | 89.49 | 88.67 | 0.67 | 0.11 | 1.61739 | 1.5652 | 0.05219 | — | 352 |
| Example 10 | 89.47 | 88.24 | 1.29 | 0.42 | 1.64199 | 1.58625 | 0.05574 | 170 | 373 |
| Comparative Example 1 | 90.07 | 89.41 | 0.63 | 0.1 | 1.66375 | 1.59338 | 0.07037 | 207 | 348 |
| Comparative Example 2 | 90.11 | 89.57 | 0.48 | 0.35 | 1.66418 | 1.60259 | 0.06159 | 199 | 355 |
| Comparative Example 3 | 90.43 | 89.98 | 0.37 | 0.14 | 1.64199 | 1.58439 | 0.0576 | 184 | 367 |

As shown from Table 2, the poly(ester-imide) films prepared from the poly(ester-imide) having two ends thereof capped with a substituted or unsubstituted alkyl amino group, according to Examples 1 to 10, exhibit high light transmittances, low YIs and hazes, and high birefringences, as well as a high 5% weight loss temperature of greater than or equal to 340° C. and a relatively low glass transition temperature ($T_g$) of less than or equal to 200° C. Referring to the films according to Examples 1 to 6, wherein all the compositions, except for the end cappers of the films are the same as each other, it is noted that there is a tendency as the longer the aliphatic chain of the end capper, the lower the glass transition temperature ($T_g$) of the film. However, the length of the aliphatic chain of the end capper hardly affects the other optical or thermal properties of the film. Accordingly, it is believed that the substituted or unsubstituted alkyl-substituted amino group end capper at both ends of the polymer may play a role as a plasticizer in the film, whereby it does not affect thermal properties of the film, but substantially affects to lower the glass transition temperature of the film.

As for the films according to Examples 1, 7, and 9, while the compositions of these films and type of the end capper are identical, the ratio between dianhydride and diamine are different from each other. In this case, as the amount of the diamine is lowered compared to the dianhydride, this results in a lower molecular weight of the prepared polymer, which may lead to a reduction in the glass transition temperature, as well as a reduction of the 5% weight loss temperature ($T_{d5\%}$) and birefringence of the film. Further, as shown from the films according to Examples 7 and 8, wherein the ratio of the dianhydride to the diamine are the same as each other, the polymer according to Example 7 having a higher amount of the end capper than that of Example 8 has a lower molecular weight (please refer to Table 1) than Example 8, and a higher thermal stability of the film (please refer to Table 2).

On the other hand, the film according to Comparative Example 1, which has the same composition as that of Example 1 but does not contain the end capper, has a lower birefringence, a higher glass transition temperature, and a lower 5% weight loss temperature ($T_{d5\%}$) than the film according to Example 1.

Further, the film according to Comparative Example 2, which has the same composition as that of Example 7 but does not contain the end capper, has a lower birefringence, a higher glass transition temperature by as much as about 16° C., and a lower 5% weight loss temperature ($T_{d5\%}$) than the film according to Example 7.

In addition, the film according to Comparative Example 3, which has the same composition as that of Example 10 but does not contain the end capper, has a higher glass transition temperature by as much as greater than 10° C., and a lower 5% weight loss temperature ($T_{d5\%}$) than the film according to Example 10, although its birefringence is similar to that of Example 10.

Accordingly, a polyimide or poly(ester-imide) having both ends thereof capped with substituted or unsubstituted alkyl amino groups, according to an exemplary embodiment, may realize equivalently good optical properties and heat resistance compared with the polyimide or poly(ester-imide) that does not have the end cappers at both ends thereof, and having an unexpectedly lowered glass transition temperature compared to the latter, and thus, may be advantageously used in industry for preparing a film due to its good processibility.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polymer represented by Chemical Formula 1 or Chemical Formula 2:

Chemical Formula 1

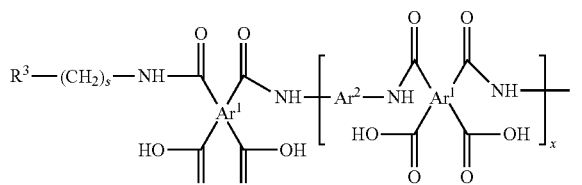

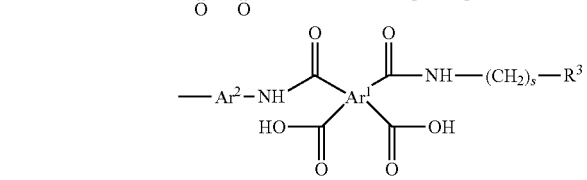

Chemical Formula 2

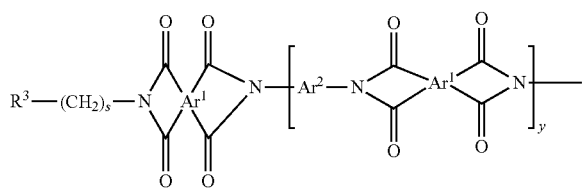

-continued

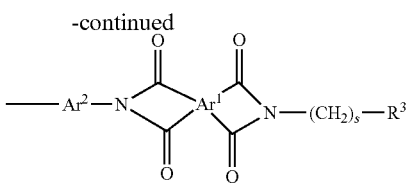

wherein, in Chemical Formula 1 and Chemical Formula 2,
$Ar^1$ of Chemical Formula 1 or Chemical Formula 2 comprises a combination of a group represented by Chemical Formula 3 and a group represented by Chemical Formula 4 and optionally, a substituted or unsubstituted C6 to C30 aromatic organic group:

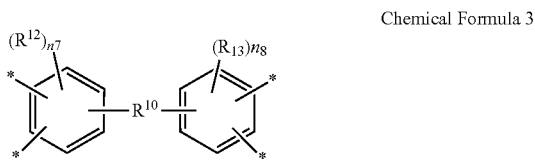

Chemical Formula 3 wherein, in Chemical Formula 3,
$R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤10, and 1≤q≤10), or a combination thereof,
$R^{12}$ and $R^{13}$ are independently a halogen, a hydroxy group, a substituted or unsubstituted C1 to C10 aliphatic organic group, a substituted or unsubstituted C6 to C20 aromatic organic group, a —OR$^{201}$ group (wherein $R^{201}$ is a C1 to C10 aliphatic organic group), or a —SiR$^{210}$R$^{211}$R$^{212}$ (wherein $R^{210}$, $R^{211}$, and $R^{212}$ are independently hydrogen or a C1 to C10 aliphatic organic group) group, and
n7 and n8 are independently one of integers of 0 to 3;

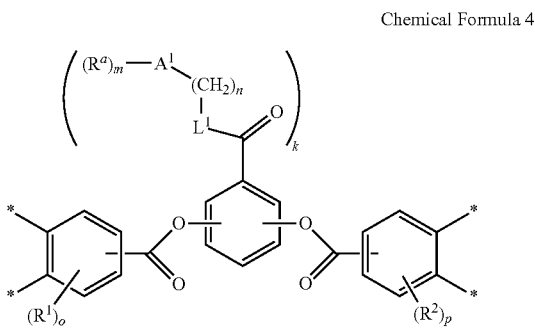

Chemical Formula 4 wherein, in Chemical Formula 4,
$R^1$ and $R^2$ are independently a substituted or unsubstituted C1 to C30 alkyl group, a substituted or unsubstituted C3 to C30 cycloalkyl group, a substituted or unsubstituted C1 to C30 alkoxy group, a substituted or unsubstituted C6 to C30 aryl group, a substituted or unsubstituted C2 to C30 acyl group, a hydroxy group, a halogen, a nitro group, —NR'R" (wherein R' and R" are independently hydrogen, a C1 to C30 alkyl group, or a C6 to C30 aryl group), —SiR'R"R'" (wherein R', R", and R'" are independently hydrogen, a C1 to C30 alkyl group, or a C6 to C30 aryl group), or a combination thereof,
$L^1$ is O,
$A^1$ is a phenyl or phenylene group,
$R^a$ is hydrogen, a C1 to C30 alkyl group, a C6 to C30 aryl group, a C7 to C30 arylalkyl group, —F, —Cl, —NR'R", —CONR'R" (wherein R' and R" are independently hydrogen, a C1 to C30 alkyl group, a C6 to C30 aryl group, or a C7 to C30 arylalkyl group), or a group represented by Chemical Formula 5:

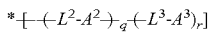 Chemical Formula 5 wherein, in Chemical Formula 5,
$L^2$ and $L^3$ are independently O, CO, COO, C≡C, or CONR$^b$ (wherein $R^b$ is hydrogen or a C1 to C30 alkyl group),
$A^2$ and $A^3$ are independently a substituted or unsubstituted C6 to C30 aromatic ring, a substituted or unsubstituted fluorene ring, or a substituted or unsubstituted C7 to C30 arylalkylene or arylalkyl group,
q and r are independently an integer ranging from 0 to 3,
k is an integer of 1,
m is an integer ranging from 0 to 2,
n is an integer ranging from 1 to 3, and
o and p are independently an integer ranging from 0 to 3;
$Ar^2$ is a substituted or unsubstituted C6 to C30 aromatic organic group, wherein the substituted or unsubstituted C6 to C30 aromatic organic group is present as a substituted or unsubstituted single aromatic ring; a fused ring comprising two or more substituted or unsubstituted aromatic rings; or a ring system comprising two or more of the substituted or unsubstituted single aromatic ring and/or the fused ring that are linked by a single bond, or a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —C(CH$_3$)$_2$—, —C(CF$_3$)$_2$—, —C(=O)NH—, or a combination thereof;
$R^3$ is hydrogen, a halogen, a vinyl group, an ethynyl group, an isopropyl group, a sec-butyl group, a tert-butyl group, a C3 to C20 cycloalkyl group, a C6 to C20 aryl group, or a combination thereof;
s is an integer ranging from 1 to 30, and
x and y are independently an integer greater than or equal to 1.

2. The polymer of claim 1, wherein $R^{10}$ of Chemical Formula 3 is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, —(CH$_2$)$_p$—C(C$_n$F$_{2n+1}$)$_2$—(CH$_2$)$_q$— (wherein 1≤n≤10, 1≤p≤3, and 1≤q≤3), or a combination thereof.

3. The polymer of claim 1, wherein $R^{10}$ of Chemical Formula 3 is a single bond, —O—, —S—, —C(=O)—, —S(=O)$_2$—, —C(CF$_3$)$_2$—, or a combination thereof.

4. The polymer of claim 1, wherein
$L^2$ and $L^3$ of Chemical Formula 5 are independently COO, C≡C, or CONR$^b$ (wherein $R^b$ is hydrogen or a C1 to C20 alkyl group),
$A^2$ and $A^3$ are independently a substituted or unsubstituted C6 to C20 aromatic ring, a substituted or unsubstituted fluorene ring, or a substituted or unsubstituted C7 to C20 arylalkylene or arylalkyl group, and q and r are independently an integer ranging from 0 to 2, provided that 1≤q+r≤2.

5. The polymer of claim 1, wherein Ar² of Chemical Formula 1 or Chemical Formula 2 is a ring system that comprises two substituted or unsubstituted C6 to C30 aromatic rings linked by a single bond, or a fluorenylene group, a substituted or unsubstituted C3 to C10 cycloalkylene group, a substituted or unsubstituted C6 to C15 arylene group, —O—, —S—, —C(=O)—, —CH(OH)—, —S(=O)₂—, —Si(CH₃)₂—, —(CH₂)$_p$— (wherein, 1≤p≤10), —(CF₂)$_q$— (wherein, 1≤q≤10), —C(CH₃)₂—, —C(CF₃)₂—, —C(=O)NH—, or a combination thereof.

6. The polymer of claim 1, wherein Ar² of Chemical Formula 1 or Chemical Formula 2 is a ring system that comprises two substituted or unsubstituted C6 to C30 aromatic rings linked by a single bond.

7. The polymer of claim 1, wherein R³ of Chemical Formula 1 or Chemical Formula 2 is a hydrogen, a halogen, a vinyl group, an ethynyl group, an isopropyl group, a sec-butyl group, a tert-butyl group, a cyclopropyl group, a cyclobutyl group, a cyclopentyl group, a cyclohexyl group, a cycloheptyl group, a cyclooctyl group, a cyclononyl group, a cyclodecyl group, a phenyl group, or a combination thereof.

8. The polymer of claim 1, wherein the group represented by Chemical Formula 3 and the group represented by Chemical Formula 4 in the combination are present in a mole ratio of about 1:99 to about 99:1.

9. The polymer of claim 1,
wherein in Chemical Formula 3, R¹⁰ comprises a single bond, —C(CF₃)₂—, or a combination thereof.

10. The polymer of claim 1, which is a reaction product of reactants comprising a tetracarboxylic dianhydride represented by Chemical Formula 7, a tetracarboxylic dianhydride represented by Chemical Formula 8, a diamine represented by Chemical Formula 9, and a monoamine represented by Chemical Formula 10, and optionally a tetracarboxylic dianhydride having a substituted or unsubstituted C6 to C30 aromatic ring group:

Chemical Formula 7

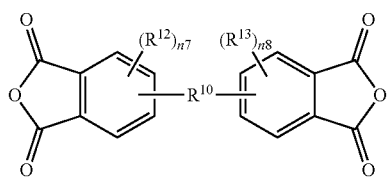

wherein, in Chemical Formula 7,
R¹⁰, R¹², R¹³, n7 and n8 are independently the same as defined in Chemical Formula 3;

Chemical Formula 8

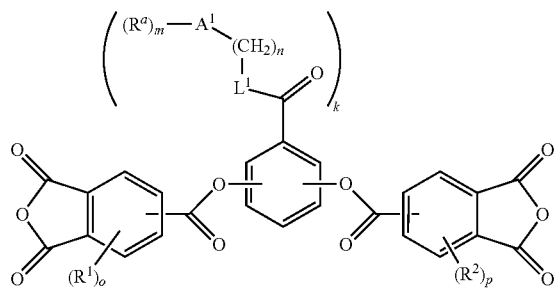

wherein, in Chemical Formula 8,
R¹, R², R$^a$, A¹, L¹, k, m, n, o, and p are independently the same as defined in Chemical Formula 4;

NH₂—Ar²—NH₂    Chemical Formula 9

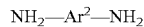

wherein, in Chemical Formula 9,
Ar² is the same as defined in claim 1;

NH₂—(CH₂)$_s$—R³    Chemical Formula 10

wherein, in Chemical Formula 10,
R³ and s are the same as defined in claim 1.

11. The polymer of claim 10, wherein a mole ratio between a total of the tetracarboxylic dianhydride represented by Chemical Formula 7, and the tetracarboxylic dianhydride represented by Chemical Formula 8, and optionally the tetracarboxylic dianhydride having a substituted or unsubstituted C6 to C30 aromatic ring group, and the diamine represented by Chemical Formula 9 in the reactants is about 1:0.8 to 0.95.

12. The polymer of claim 10, wherein a mole ratio between a total of the tetracarboxylic dianhydride represented by Chemical Formula 7, and the tetracarboxylic dianhydride represented by Chemical Formula 8, and optionally the tetracarboxylic dianhydride having a substituted or unsubstituted C6 to C30 aromatic ring group, and the monoamine represented by Chemical Formula 10 in the reactants about 1:0.1 to 0.4.

13. A film comprising the polymer according to claim 1.

14. The film according to claim 13, wherein the film has a glass transition temperature of from about 160° C. to about 200° C.

15. The film according to claim 13, wherein the film has a birefringence of greater than 0.05, measured at a wavelength of 450 nm by using a prism coupler.

16. An optical film comprising the film according to claim 13, and a polarizer.

17. A display device comprising the film according to claim 13.

* * * * *